(12) United States Patent
Murakoso et al.

(10) Patent No.: US 10,962,841 B2
(45) Date of Patent: Mar. 30, 2021

(54) LIQUID CRYSTAL DISPLAY DEVICE AND THE METHOD OF MANUFACTURING THE SAME

(71) Applicants: Panasonic Liquid Crystal Display Co., Ltd., Himeji (JP); Pasona Knowledge Partner Inc., Osaka (JP)

(72) Inventors: Tomohiro Murakoso, Hyogo (JP); Kazuhiko Tsuda, Hyogo (JP); Ikuko Mori, Hyogo (JP)

(73) Assignees: Panasonic Liquid Crystal Display Co., Ltd., Hyogo (JP); Pasona Knowledge Partner Inc., Osaka (JP)

(*) Notice: Subject to any disclaimer, the term of this patent is extended or adjusted under 35 U.S.C. 154(b) by 232 days.

(21) Appl. No.: 15/883,764

(22) Filed: Jan. 30, 2018

(65) Prior Publication Data

US 2018/0217424 A1 Aug. 2, 2018

(30) Foreign Application Priority Data

Jan. 30, 2017 (JP) .............................. JP2017-013929

(51) Int. Cl.
*G02F 1/1339* (2006.01)
*G02F 1/1335* (2006.01)
(Continued)

(52) U.S. Cl.
CPC ........ *G02F 1/1339* (2013.01); *G02F 1/13394* (2013.01); *G02F 1/133345* (2013.01);
(Continued)

(58) Field of Classification Search
CPC ....... G02F 1/13394; G02F 2001/13396; G02F 2001/134372; G09G 2300/023
See application file for complete search history.

(56) References Cited

U.S. PATENT DOCUMENTS

2005/0046779 A1* 3/2005 Sumi ................... G02F 1/13394
349/155
2007/0046847 A1* 3/2007 Lee ................... G02F 1/136286
349/43

(Continued)

FOREIGN PATENT DOCUMENTS

JP 2005-165082 6/2005
JP 2010-039302 2/2010
(Continued)

OTHER PUBLICATIONS

Office Action issued in Japanese Patent Application No. 2017-013929, dated Sep. 15, 2020, 9 pages.

*Primary Examiner* — Alexander P Gross
(74) *Attorney, Agent, or Firm* — Hamre, Schumann, Mueller & Larson, P.C.

(57) ABSTRACT

A liquid crystal display device in which a plurality of display panels are disposed so as to overlap each other and which displays an image on each of the plurality of display panels. The liquid crystal display device includes a first display panel; and a second display panel disposed so as to overlap the first display panel. The second display panel includes a first substrate on which a source line, a gate line, a thin film transistor, and an organic insulator are formed, a second substrate disposed opposite to the first substrate, and a liquid crystal layer disposed between the first substrate and the second substrate, a first spacer is formed in the first substrate to hold a distance between the first substrate and the second substrate. The first spacer and the organic insulator are made of a positive photosensitive resin.

11 Claims, 22 Drawing Sheets

(51) Int. Cl.
    *G02F 1/1333* (2006.01)
    *G02F 1/1362* (2006.01)
    *G09G 3/36* (2006.01)
    *G02F 1/1343* (2006.01)
    *G02F 1/13357* (2006.01)

(52) U.S. Cl.
    CPC .............. *G02F 1/133514* (2013.01); *G02F 2001/13396* (2013.01); *G02F 2001/13398* (2013.01); *G02F 2001/133601* (2013.01); *G02F 2001/134372* (2013.01); *G02F 2001/136295* (2013.01); *G02F 2202/28* (2013.01); *G09G 3/3611* (2013.01); *G09G 3/3677* (2013.01); *G09G 3/3688* (2013.01); *G09G 2300/023* (2013.01); *G09G 2300/0426* (2013.01); *G09G 2310/08* (2013.01); *G09G 2320/066* (2013.01)

(56) References Cited

U.S. PATENT DOCUMENTS

| | | | |
|---|---|---|---|
| 2007/0291217 A1* | 12/2007 | Kang | G02F 1/136227 349/156 |
| 2009/0147186 A1 | 6/2009 | Nakai et al. | |
| 2009/0303419 A1* | 12/2009 | Koma | G02F 1/1347 349/74 |
| 2010/0033668 A1 | 2/2010 | Koito et al. | |
| 2011/0261268 A1 | 10/2011 | Nakai et al. | |
| 2017/0133413 A1* | 5/2017 | Park | H01L 27/1288 |

FOREIGN PATENT DOCUMENTS

| | | |
|---|---|---|
| JP | 2012-159758 | 8/2012 |
| WO | 2007/040127 | 4/2007 |

\* cited by examiner

LIQUID CRYSTAL DISPLAY DEVICE AND THE METHOD OF MANUFACTURING THE SAME

CROSS-REFERENCE TO RELATED APPLICATION

The present application claims priority from Japanese application JP 2017-013929 filed on Jan. 30, 2017, the content of which is hereby incorporated by reference into this application.

TECHNICAL FIELD

This disclosure relates with liquid crystal display device and the method of manufacturing the liquid crystal display device.

BACKGROUND

A technique, in which two display panels overlap each other and an image is displayed on each display panel based on an input video signal, is conventionally proposed to improve contrast of a liquid crystal display device (for example, see PCT International Publication No. WO2007/040127). Specifically, for example, a color image is displayed on a front-side (observer-side) display panel in two display panels disposed back and forth, and a black-and-white image is displayed on a rear-side (backlight-side) display panel, thereby improving contrast.

SUMMARY

In the liquid crystal display device constructed with the two display panels, a manufacturing process becomes about double the liquid crystal display device constructed with one display panel, which results in an increase in manufacturing cost.

The present disclosure is made in consideration of such a situation, and an object of the present disclosure is to simplify the process of manufacturing the liquid crystal display device in which the plurality of display panels overlap each other.

In one general aspect, the instant application describes a liquid crystal display device in which a plurality of display panels are disposed so as to overlap each other and which displays an image on each of the plurality of display panels. The liquid crystal display device includes a first display panel; and a second display panel disposed so as to overlap the first display panel. The second display panel includes a first substrate on which a source line, a gate line, a thin film transistor, and an organic insulator are formed, a second substrate disposed opposite to the first substrate, and a liquid crystal layer disposed between the first substrate and the second substrate, a first spacer is formed in the first substrate to hold a distance between the first substrate and the second substrate. The first spacer and the organic insulator are made of a positive photosensitive resin.

The above general aspect may include one or more of the following features.

The first spacer and the organic insulator may be integrated with each other.

The second display panel may include the gate line formed on the first substrate, a gate insulator that is formed on the first substrate so as to cover the gate line, an electrode constituting the thin film transistor formed on the gate insulator, a protective insulator covering the electrode, the organic insulator formed on the protective insulator, a common electrode formed on the organic insulator, an upper insulator covering the common electrode, and the first spacer and a pixel electrode, which are formed on the upper insulator.

The second display panel may include the gate line formed on the first substrate, a gate insulator that is formed on the first substrate so as to cover the gate line, an electrode constituting the thin film transistor formed on the gate insulator, a protective insulator covering the electrode, the organic insulator formed on the protective insulator, a common electrode formed on the organic insulator, an upper insulator covering the common electrode, and a pixel electrode formed on the upper insulator. The first spacer may be integral with the organic insulator.

The second display panel may further include a second spacer formed on the first substrate. A space may be formed between the second spacer and the second substrate. The second spacer may be made of a positive photosensitive resin.

The first spacer may overlap the source line in planar view, and the second spacer does not overlap the source line in planar view.

The second display panel may further include a pixel electrode formed on the first substrate, a common electrode that is disposed opposite to the pixel electrode, and a common wiring electrically connected to the common electrode, the common wiring being formed by a metallic layer. The first spacer may overlap the common wiring in planar view, and the second spacer may not overlap the common wiring in planar view.

The first spacer, the second spacer, and the organic insulator may be integrated with one another, and a height of the first spacer may be substantially equal to a height of the second spacer, based on an upper surface of the organic insulator on the liquid crystal layer side.

The first spacer, the second spacer, and the organic insulator may be integrated with one another, and a height of the first spacer may be higher than a height of the second spacer, based on an upper surface of the organic insulator on a liquid crystal layer side.

The first display panel may include a third substrate on which a source line, a gate line, and a thin film transistor are formed and a fourth substrate disposed opposite to third substrate. A third spacer is formed in the fourth substrate to hold a distance between the third substrate and the fourth substrate, and the third spacer may be made of a negative photosensitive resin.

A color filter may be formed on one of the third substrate and the fourth substrate.

An inclination angle of the first spacer to an installation surface may be less than 60 degrees, and an inclination angle of the third spacer to an installation surface may be greater than or equal to 60 degrees.

A number of pixels per unit area in the second display panel may be smaller than a number of pixels per unit area in the first display panel.

In another general aspect, the liquid crystal display device of the instant application includes a first substrate; a second substrate disposed opposite to the first substrate; a liquid crystal layer disposed between the first substrate and the second substrate; a source line formed on the first substrate; a gate line formed on the first substrate; a thin film transistor formed on the first substrate; an organic insulator formed on the first substrate; and a first spacer holding a distance between the first substrate and the second substrate. The first spacer and the organic insulator are made of a positive photosensitive resin.

In another general aspect, a method for manufacturing a liquid crystal display device in which a first display panel and a second display panel overlap each other, the second display panel including a first substrate, a source line, a gate line, and a thin film transistor, which are formed on the first substrate, a second substrate disposed opposite to the first substrate, and a liquid crystal layer disposed between the first substrate and the second substrate. The method may include a step of manufacturing the second display panel, the step including steps of: forming the gate line on the first substrate; covering the gate line with a gate insulator; forming an electrode constituting the thin film transistor on the gate insulator; covering the electrode with a protective insulator; forming an organic insulator made of a positive photosensitive resin on the protective insulator; forming a common electrode on the organic insulator; covering the common electrode with an upper insulator; forming a pixel electrode on the upper insulator; and forming a first spacer holding a distance between the first substrate and the second substrate using the positive photosensitive resin.

The above general aspect may include one or more of the following features.

The first spacer may be formed in the step of forming the organic insulator.

After the positive photosensitive resin is applied onto the protective insulator, the organic insulator may be formed by exposing a first region of the positive photosensitive resin with a first exposure volume, and the first spacer may be formed by exposing a second region of the positive photosensitive resin with a second exposure volume less than the first exposure volume.

The process of manufacturing the liquid crystal display device in which the plurality of display panels overlap each other can be simplified in the liquid crystal display device and the method for manufacturing a liquid crystal display device of the present disclosure.

DETAILED DESCRIPTION

Hereinafter, an exemplary embodiment of the present disclosure will be described with reference to the drawings. A liquid crystal display device according to one exemplary embodiment includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. When viewed from the observer side, the plurality of display panels are disposed while overlapping each other in a front-back direction. An image is displayed on each of the display panels. A liquid crystal display device including two display panels will be described below by way of example. The number of the display panel is not limited to the plural, and one display panel may be provided.

Figure 1:
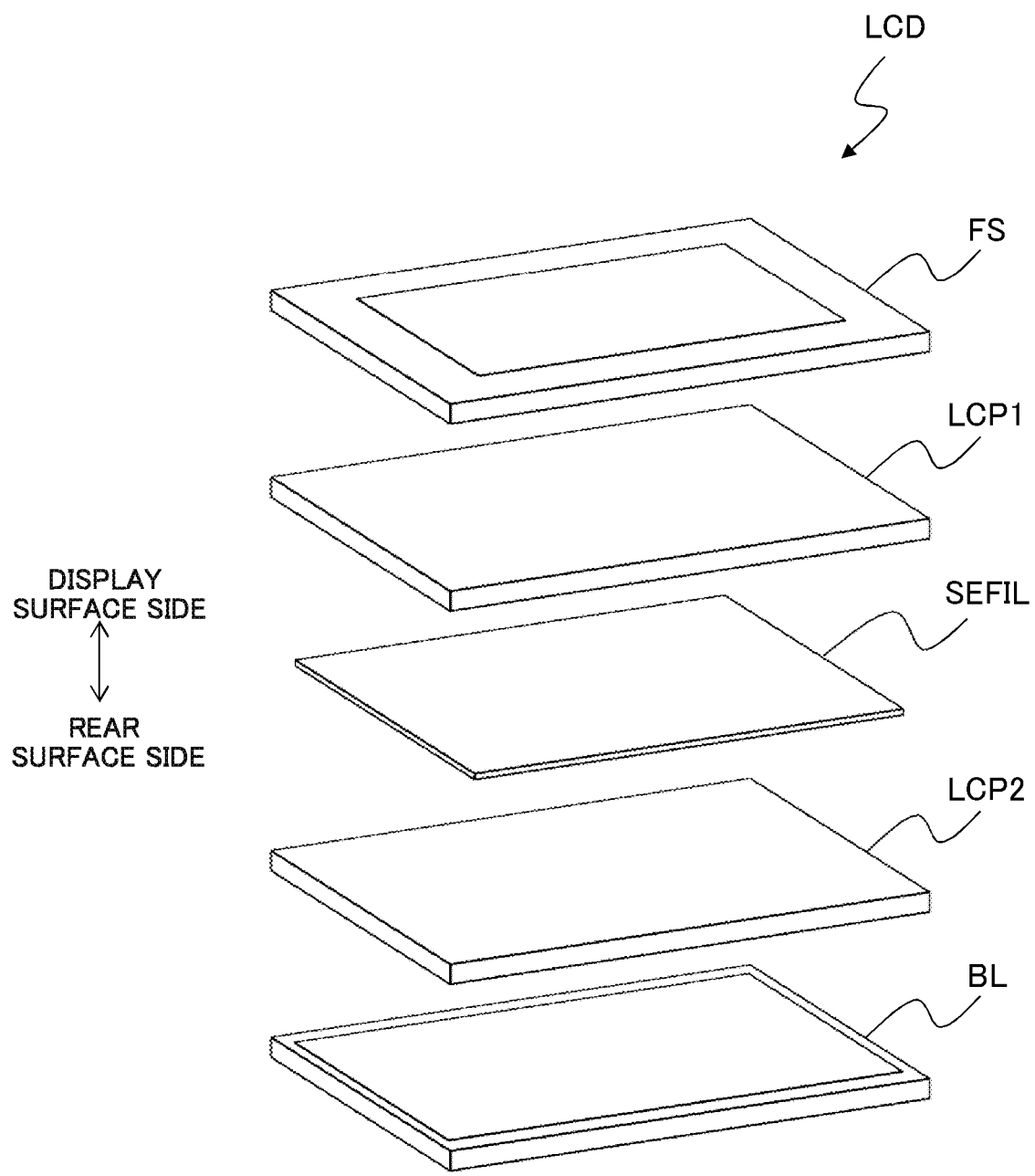
FIG. 1 is a perspective view illustrating a schematic configuration of liquid crystal display device of this exemplary embodiment.

FIG. 1 is a perspective view illustrating a schematic configuration of liquid crystal display device LCD of the exemplary embodiment. As illustrated in FIG. 1, liquid crystal display device LCD includes display panel LCP1 disposed at a position (front side) closer to an observer, display panel LCP2 disposed at a position (rear side) farther away from the observer with respect to display panel LCP1, adhesive layer SEFIL in which display panel LCP1 and display panel LCP2 adhere to each other, backlight BL disposed on the rear surface side of display panel LCP2, and front chassis FS that covers display panel LCP1 and display panel LCP2 from the display surface side.

Figure 2:
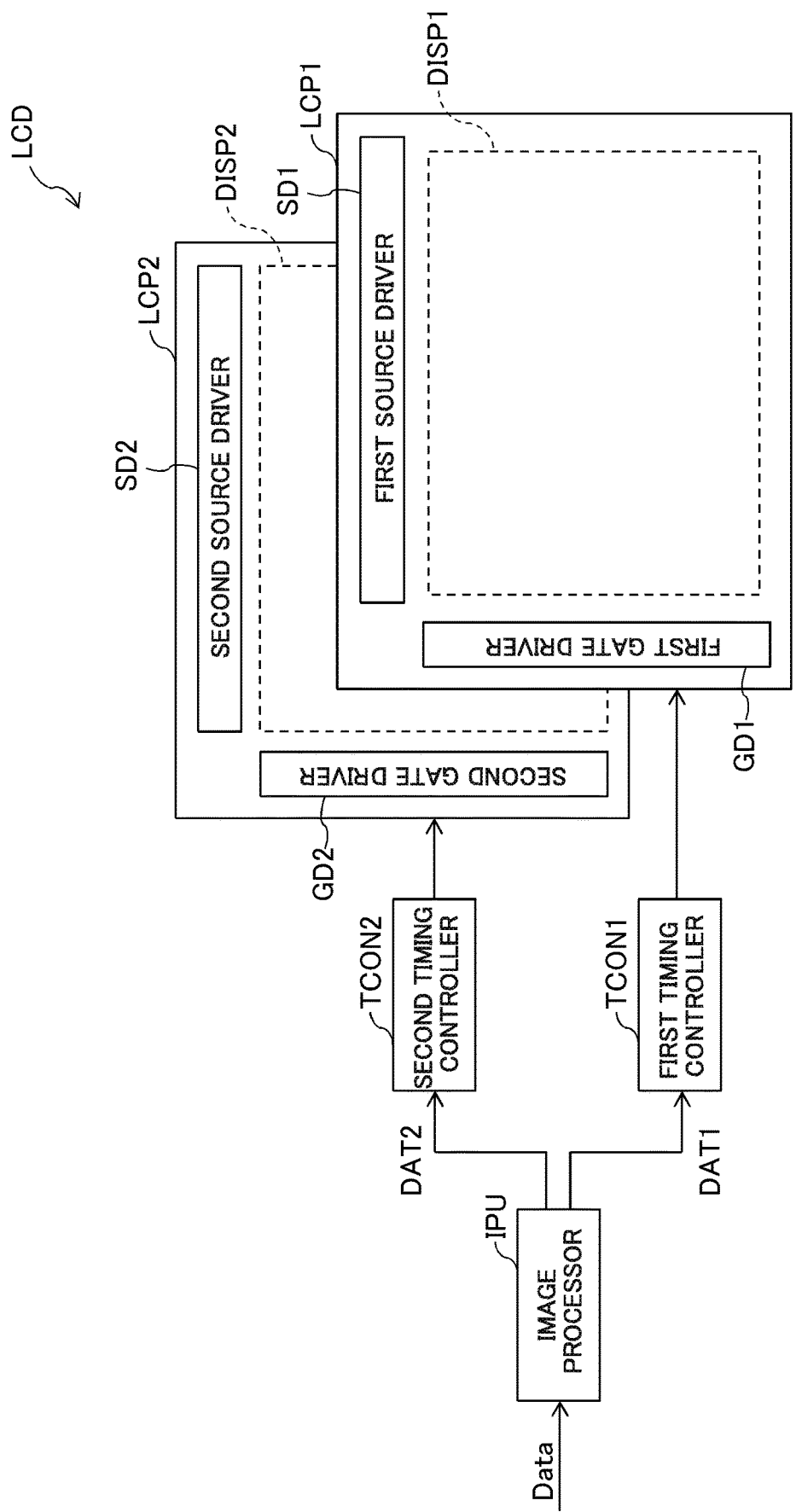
FIG. 2 is a view illustrating the schematic configuration of liquid crystal display device of the exemplary embodiment.

FIG. 2 is a view illustrating the schematic configuration of liquid crystal display device LCD of the exemplary embodiment. As illustrated in FIG. 2, display panel LCP1 includes first source driver SD1 and first gate driver GD1, and display panel LCP2 includes second source driver SD2 and second gate driver GD2. Liquid crystal display device LCD also includes first timing controller TCON1 that controls first source driver SD1 and first gate driver GD1, second timing controller TCON2 that controls second source driver SD2 and second gate driver GD2, and image processor IPU that outputs image data to first timing controller TCON1 and second timing controller TCON2. For example, display panel LCP1 displays a color image in first image display region DISP1 according to the input video signal, and display panel LCP2 displays a black-and-white image in second image display region DISP2 according to the input video signal. Image processor IPU receives input video signal Data transmitted from an external system (not illustrated), performs known image processing on input video signal Data, and then outputs first image data DAT1 to first timing controller TCON1 and outputs second image data DAT2 to second timing controller TCON2. Image processor IPU also outputs a control signal (not illustrated in FIG. 2) such as a synchronizing signal to first timing controller TCON1 and second timing controller TCON2. For example, first image data DAT1 is image data for displaying the color image, and second image data DAT2 is image data for displaying the monochrome image.

Figure 3:
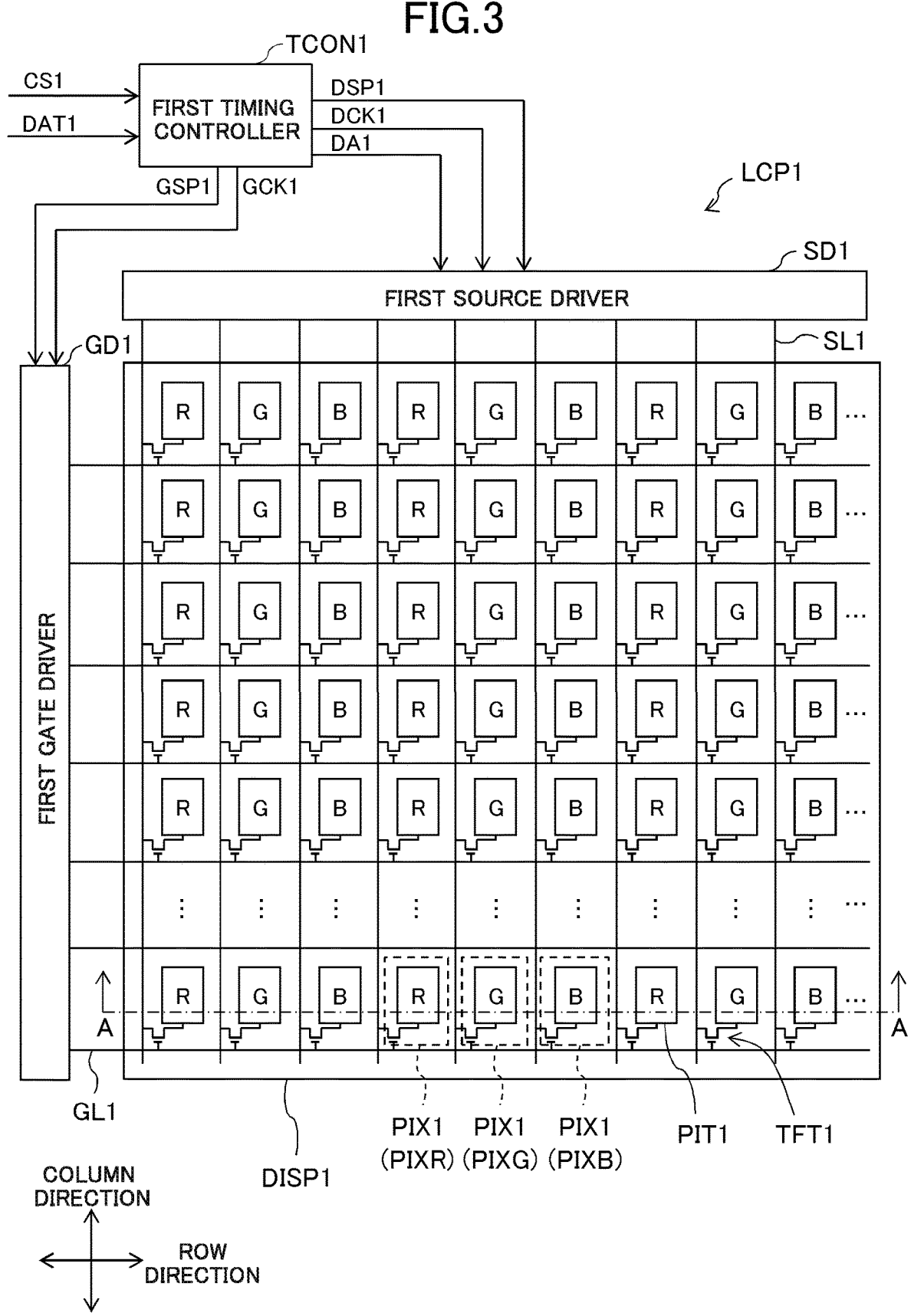
FIG. 3 is a plan view illustrating a schematic configuration of display panel LCP1.
Figure 4:
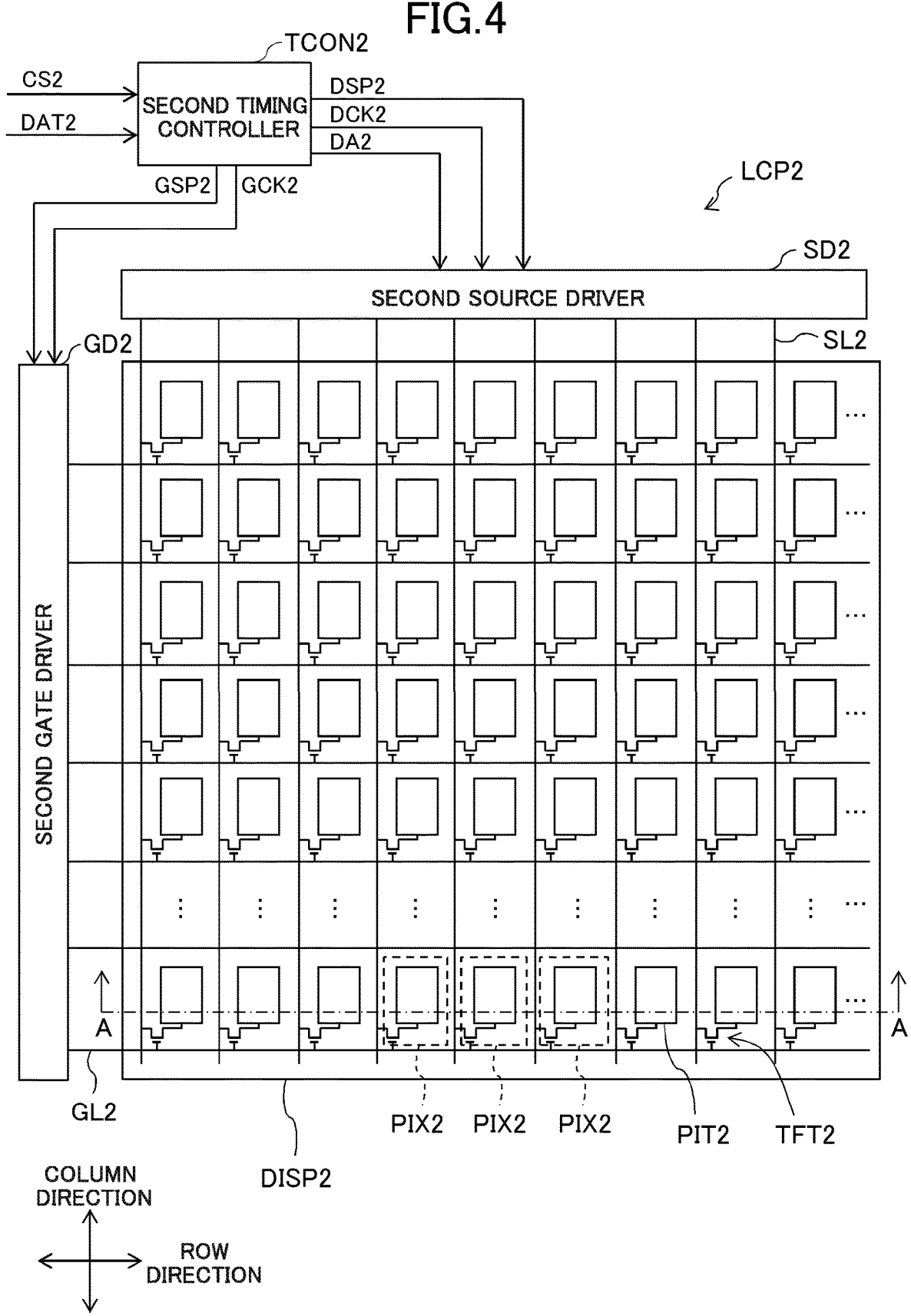
FIG. 4 is a plan view illustrating a schematic configuration of display panel LCP2.
Figure 5:
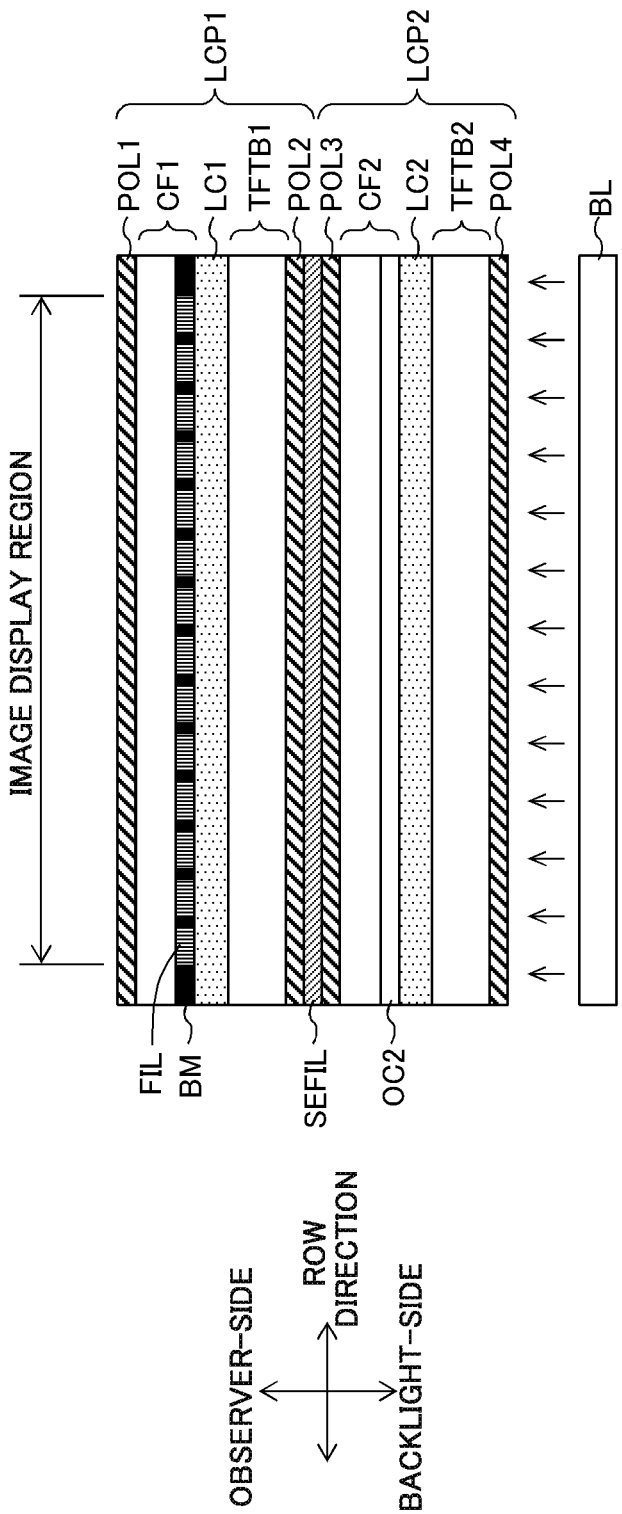
FIG. 5 is a sectional view taken along line A-A in FIGS. 3 and 4.
Figure 6:
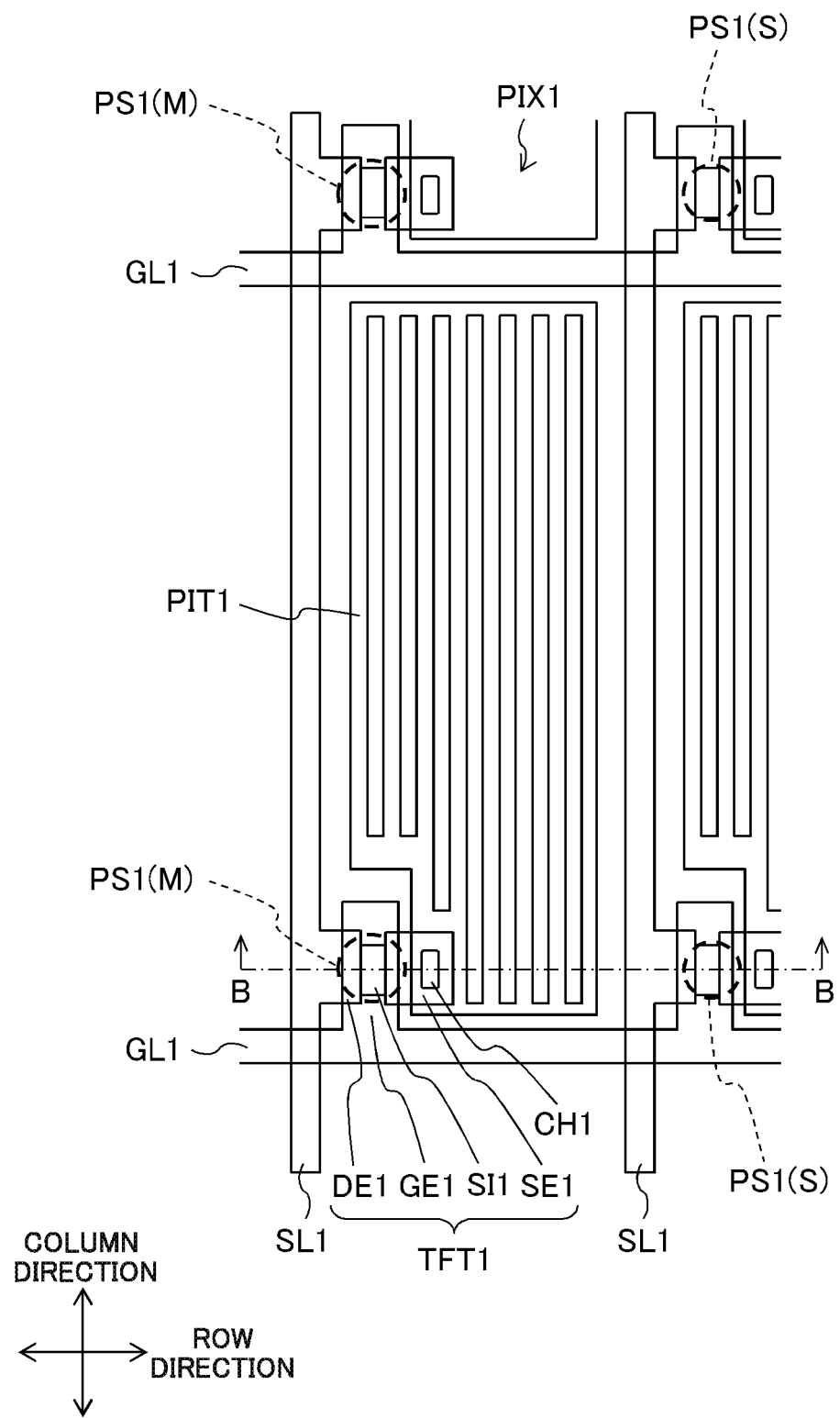
FIG. 6 is a plan view illustrating a schematic configuration of pixel of display panel LCP1.
Figure 7:
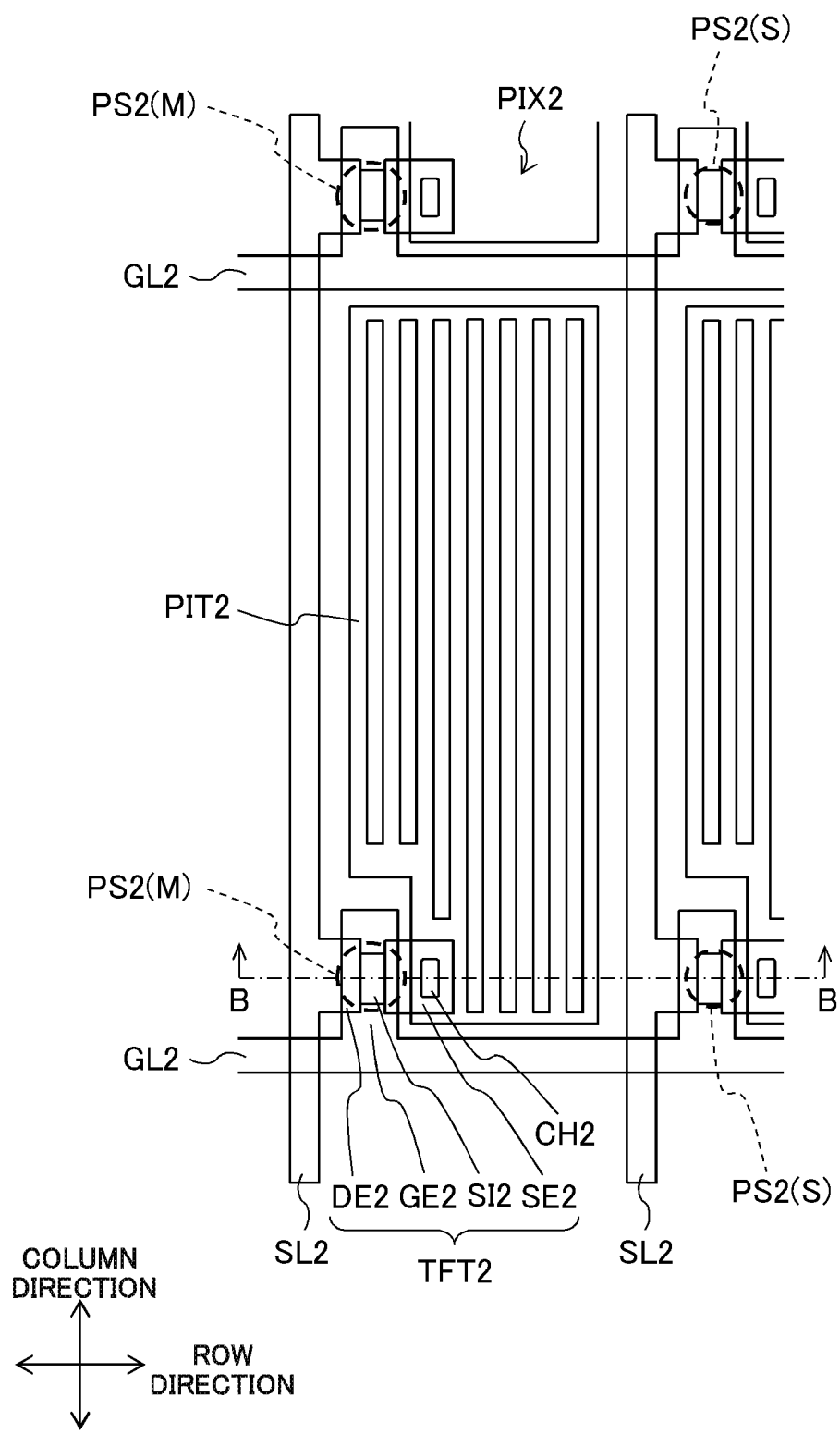
FIG. 7 is a plan view illustrating a schematic configuration of pixel of display panel LCP2.

FIG. 3 is a plan view illustrating a schematic configuration of display panel LCP1, and FIG. 4 is a plan view illustrating a schematic configuration of display panel LCP2. FIG. 5 is a sectional view taken along line A-A in FIGS. 3 and 4. FIG. 6 is a plan view illustrating a schematic configuration of pixel PIX1 of display panel LCP1, and FIG. 7 is a plan view illustrating a schematic configuration of pixel PIX2 of display panel LCP2.

The schematic configuration of display panel LCP1 will be described with reference to FIGS. 3, 5, and 6. As illustrated in FIG. 5, display panel LCP1 includes thin film transistor substrate TFTB1 disposed on the side of backlight BL, counter substrate CF1, which is disposed on the observer side while being opposite to thin film transistor substrate TFTB1, and liquid crystal layer LC1 disposed between thin film transistor substrate TFTB1 and counter substrate CF1. Polarizing plate POL2 is disposed on the side of backlight BL of display panel LCP1, and polarizing plate POL1 is disposed on the observer side.

In thin film transistor substrate TFTB1, as illustrated in FIGS. 3 and 6, a plurality of source lines SL1 extending in a first direction (for example, a column direction), and a plurality of gate lines GL1 extending in a second direction (for example, a row direction) different from the first direction are formed, and thin film transistor TFT1 is formed close to an intersection between each of the plurality of source lines SL1 and each of the plurality of gate lines GL1. In plan view of display panel LCP1, a region surrounded by two source lines SL1 adjacent to each other and two gate lines GL1 adjacent to each other is defined as one pixel PIX1, and a plurality of pixels PIX1 are disposed in a matrix form (the row direction and the column direction). The plurality of source lines SL1 are disposed at equal intervals in the row direction, and the plurality of gate lines GL1 are disposed at equal intervals in the column direction. In thin film transistor substrate TFTB1, pixel electrode PIT1 is formed in each pixel PIX1, and one common electrode CIT1 (see FIG. 9) common to the plurality of pixels PIX1 is formed. Drain electrode DE1 constituting thin film transistor TFT1 is electrically connected to source line SL1, source electrode SE1 is electrically connected to pixel electrode PIT1 through contact hole CH1, and gate electrode GE1 is electrically connected to gate line GL1.

As illustrated in FIG. 5, a light transmission unit that transmits light and black matrix BM (a light shielding unit) that obstructs the light transmission are formed in counter substrate CF1. A plurality of color filters FIL (colored layer) are formed in the light transmission unit according to each pixel PIX1. The light transmission unit is surrounded by black matrix BM. For example, the light transmission unit is formed into a rectangular shape. The plurality of color filters FIL include red color filters FILR (red layer) made of a red (R color) material to transmit red light, green color filters FILG (green layer) made of a green (G color) material to transmit green light, and blue color filters FILB (blue layer) made of a blue (B color) material to transmit blue light. Red color filters FILR, green color filters FILG, and blue color filters FILB are repeatedly arrayed in the row direction in this order, identical-color filters FIL are arrayed in the column direction, and black matrix BM1 is formed at a boundary between color filters FIL adjacent to each other in the row direction and the column direction. According to each color filter FIL, as illustrated in FIG. 3, the plurality of pixels PIX1 include red pixels PIXR corresponding to red color filter FILR, green pixels PIXG corresponding to green color filter FILG, and blue pixels PIXB corresponding to blue color filter FILB. In display panel LCP1, red pixels PIXR, green pixels PIXG, and blue pixels PIXB are repeatedly arrayed in the row direction in this order, and pixels PIX1 having the identical color are arrayed in the column direction.

Black matrix BM and color filter FIL (red color filter FILR, green color filter FILG, and blue color filter FILB) may be formed on thin film transistor substrate TFTB1. That is, display panel LCP1 may include a configuration of color filter on array (COA).

A plurality of spacers PS1 (third spacer), which are disposed between thin film transistor substrate TFTB1 and counter substrate CF1 while holding a distance (gap) between both the substrates, are formed in counter substrate CF1. In FIG. 6, for convenience, an external form of spacer PS1 is indicated by a dotted line. As illustrated in FIG. 6, spacer PS1 is disposed so as to overlap a part of thin film transistor TFT1 in planar view. One or a plurality of spacers PS1 may be provided with respect to one pixel group including pixel PIX1 (for example, red pixel PIXR, green pixel PIXG, and blue pixel PIXB) of each color, or one spacer PS1 may be provided with respect to a plurality of pixel groups. A shape of spacer PS1 is not limited to a columnar shape, but may be a prismatic shape or a conical shape. Spacer PS1 may include two kinds of spacers in which heights are different from each other. Specifically, spacer PS1 may include main spacer PS1(M) (see FIG. 9) that is in contact with thin film transistor substrate TFTB1 in a normal state and sub-spacer PS1(S) (see FIG. 9). A space is formed between thin film transistor substrate TFTB1 and sub-spacer PS1(S) while sub-spacer PS1(S) is not in contact with thin film transistor substrate TFTB1 in the normal state, and sub-spacer PS1(S) comes into contact with thin film transistor substrate TFTB1 when display panel LCP1 is deformed. Improvement of pressure tightness and prevention of bubble generation during low temperatures can be achieved by providing sub-spacer PS1(S).

First timing controller TCON1 has a known configuration. For example, based on first image data DAT1 and first control signal CS1 (such as a clock signal, a vertical synchronizing signal, and a horizontal synchronizing signal), which are output from image processor IPU, first timing controller TCON1 generates various timing signals (data start pulse DSP1, data clock DCK1, gate start pulse GSP1, and gate clock GCK1) to control first image data DA1 and drive of first source driver SD1 and first gate driver GD1 (see FIG. 3). First timing controller TCON1 outputs first image data DA1, data start pulse DSP1, and data clock DCK1 to first source driver SD1, and outputs gate start pulse GSP1 and gate clock GCK1 to first gate driver GD1.

First source driver SD1 outputs a data signal (data voltage) corresponding to first image data DA1 to source line SL1 based on data start pulse DSP1 and data clock DCK1. First gate driver GD1 outputs a gate signal (gate voltage) to gate lines GL1 based on gate start pulse GSP1 and gate clock GCK1.

First source driver SD1 supplies the data voltage to each source line SL1, and first gate driver GD1 supplies the gate voltage to each gate line GL1. Common voltage Vcom is supplied from a common driver (not illustrated) to common electrode CIT1. When the gate voltage (gate-on voltage) is supplied to gate line GL1, thin film transistor TFT1 connected to gate line GL1 is turned on, and the data voltage is supplied to pixel electrode PIT1 through source line SL1 connected to thin film transistor TFT1. An electric field is generated by a difference between the data voltage supplied to pixel electrode PIT1 and common voltage Vcom supplied to common electrode CIT1. The liquid crystal is driven by the electric field, and transmittance of the light emitted from backlight BL is controlled, thereby displaying an image. In display panel LCP1, a color image is displayed by the supply of a desired data voltage to source line SL1 connected to pixel electrode PIT1 of each of red pixel PIXR, green pixel PIXG, and blue pixel PIXB.

The configuration of display panel LCP2 will be described below with reference to FIGS. 4, 5, and 7. As illustrated in FIG. 5, display panel LCP2 includes thin film transistor substrate TFTB2 disposed on the side of backlight BL, counter substrate CF2, which is disposed on the observer side while being opposite to thin film transistor substrate TFTB2, and liquid crystal layer LC2 disposed between thin film transistor substrate TFTB2 and counter substrate CF2. Polarizing plate POL4 is disposed on the side of backlight BL of display panel LCP2, and polarizing plate POL3 is disposed on the observer side. Adhesive layer SEFIL is disposed between polarizing plate POL2 of display panel LCP1 and polarizing plate POL3 of display panel LCP2.

In thin film transistor substrate TFTB2, as illustrated in FIGS. 4 and 7, a plurality of source lines SL2 extending in the column direction, and a plurality of gate lines GL2 extending in the row direction are formed, and thin film transistor TFT2 is formed close to the intersection between each of the plurality of source lines SL2 and each of the plurality of gate lines GL2. In plan view of display panel LCP2, a region surrounded by two source lines SL2 adjacent to each other and two gate lines GL2 adjacent to each other is defined as one pixel PIX2, and a plurality of pixels PIX2 are disposed in a matrix form (the row direction and the column direction). The plurality of source lines SL2 are disposed at equal intervals in the row direction, and the plurality of gate lines GL2 are disposed at equal intervals in the column direction. In thin film transistor substrate TFTB2, pixel electrode PIT2 is formed in each pixel PIX2, and one common electrode CIT2 (see FIG. 9) common to the plurality of pixels PIX2 is formed. Drain electrode DE2 constituting thin film transistor TFT2 is electrically connected to source line SL2, source electrode SE2 is electrically connected to pixel electrode PIT2 through contact hole CH2, and gate electrode GE2 is electrically connected to gate line GL2.

A plurality of spacers PS2, which are disposed between thin film transistor substrate TFTB2 and counter substrate CF2 while holding a distance (gap) between both the substrates, are formed in thin film transistor substrate TFTB2. In FIG. 7, for convenience, an external form of spacer PS2 is indicated by a dotted line. As illustrated in FIG. 7, spacer PS2 is disposed so as to overlap a part of thin film transistor TFT2 in planar view. One or a plurality of spacers PS2 may be provided with respect to one pixel group including a plurality of pixel PIX2 (for example, three pixels PIX2 corresponding to red pixel PIXR, green pixel PIXG, and blue pixel PIXB of display panel LCP1), or one spacer PS2 may be provided with respect to a plurality of pixel groups. A shape of spacer PS2 is not limited to a columnar shape, but may be a prismatic shape or a conical shape. Spacer PS2 may include two kinds of spacers in which heights are different from each other. Specifically, spacer PS2 may include main spacer PS2(M) (first spacer) (see FIG. 9) that is in contact with counter substrate CF2 in the normal state and sub-spacer PS2(S) (second spacer) (see FIG. 9). A space is formed between counter substrate CF2 and sub-spacer PS2(S) while sub-spacer PS2(S) is not in contact with counter substrate CF2 in the normal state, and sub-spacer PS2(S) comes into contact with counter substrate CF2 when display panel LCP2 is deformed. The improvement of the pressure tightness and the prevention of the bubble generation during low temperatures can be achieved by providing sub-spacer PS2(S). Spacer PS1 of display panel LCP1 and spacer PS2 of display panel LCP2 are disposed such that a center position of spacer PS1 is matched with a center of spacer PS2 in planar view. The number of spacer PS1 may be equal to or different from the number of spacer PS2.

As illustrated in FIG. 5, the black matrix (light shielding portion) and the color filter (colored portion) are not formed in counter substrate CF2, but overcoat film OC2 is formed in counter substrate CF2.

Second timing controller TCON2 has a known configuration. For example, based on second image data DAT2 and second control signal CS2 (such as a clock signal, a vertical synchronizing signal, and a horizontal synchronizing signal), which are output from image processor IPU, second timing controller TCON2 generates various timing signals (data start pulse DSP2, data clock DCK2, gate start pulse GSP2, and gate clock GCK2) to control second image data DA2 and drive of second source driver SD2 and second gate driver GD2 (see FIG. 4). Second timing controller TCON2 outputs second image data DA2, data start pulse DSP2, and data clock DCK2 to second source driver SD2, and outputs gate start pulse GSP2 and gate clock GCK2 to second gate driver GD2.

Second source driver SD2 outputs the data voltage corresponding to second image data DA2 to source line SL2 based on data start pulse DSP2 and data clock DCK2. Second gate driver GD2 outputs the gate voltage to gate lines GL2 based on gate start pulse GSP2 and gate clock GCK2.

Second source driver SD2 supplies the data voltage to each source line SL2, and second gate driver GD2 supplies the gate voltage to each gate line GL2. The common driver supplies common voltage Vcom to common electrode CIT2. When the gate voltage (gate-on voltage) is supplied to gate line GL2, thin film transistor TFT2 connected to gate line GL2 is turned on, and the data voltage is supplied to pixel electrode PIT2 through source line SL2 connected to thin film transistor TFT2. An electric field is generated by a difference between the data voltage supplied to pixel electrode PIT2 and common voltage Vcom supplied to common electrode CIT2. The liquid crystal is driven by the electric field, and transmittance of the light emitted from backlight BL is controlled, thereby displaying an image. A black-and-white image is displayed on display panel LCP2.

Figure 8A:
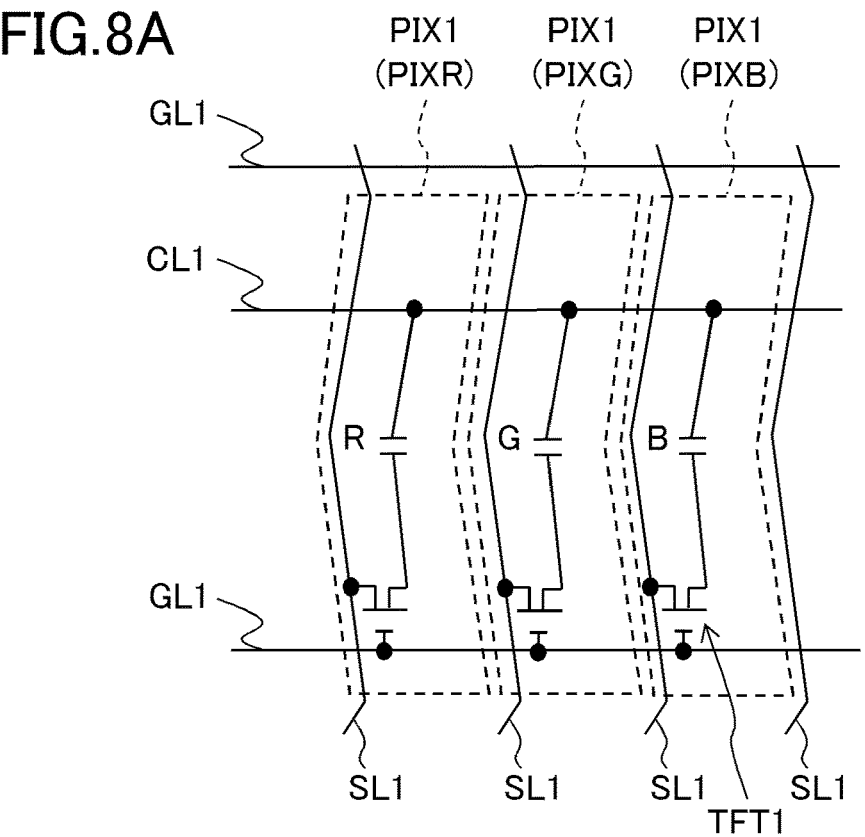
FIGS. 8A and 8B are plan views each illustrating a disposition relationship between pixel of display panel LCP1 and pixel of display panel LCP2.
Figure 8B:
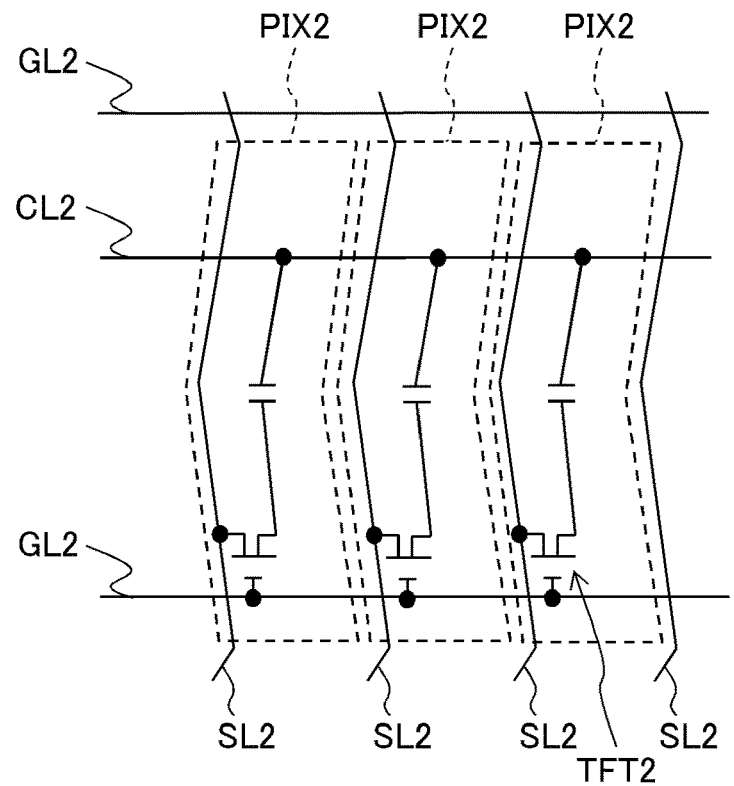

FIGS. 8A and 8B are plan views each illustrating a disposition relationship between pixel PIX1 of display panel LCP1 and pixel PIX2 of display panel LCP2. Liquid crystal display device LCD is configured such that a number of pixels PIX1 per unit area of display panel LCP1 is equal to a number of pixels PIX2 per unit area of display panel LCP2. An area of one pixel PIX1 is equal to an area of one pixel PIX2. That is, display panel LCP1 and display panel LCP2 have identical resolution.

Figure 9:
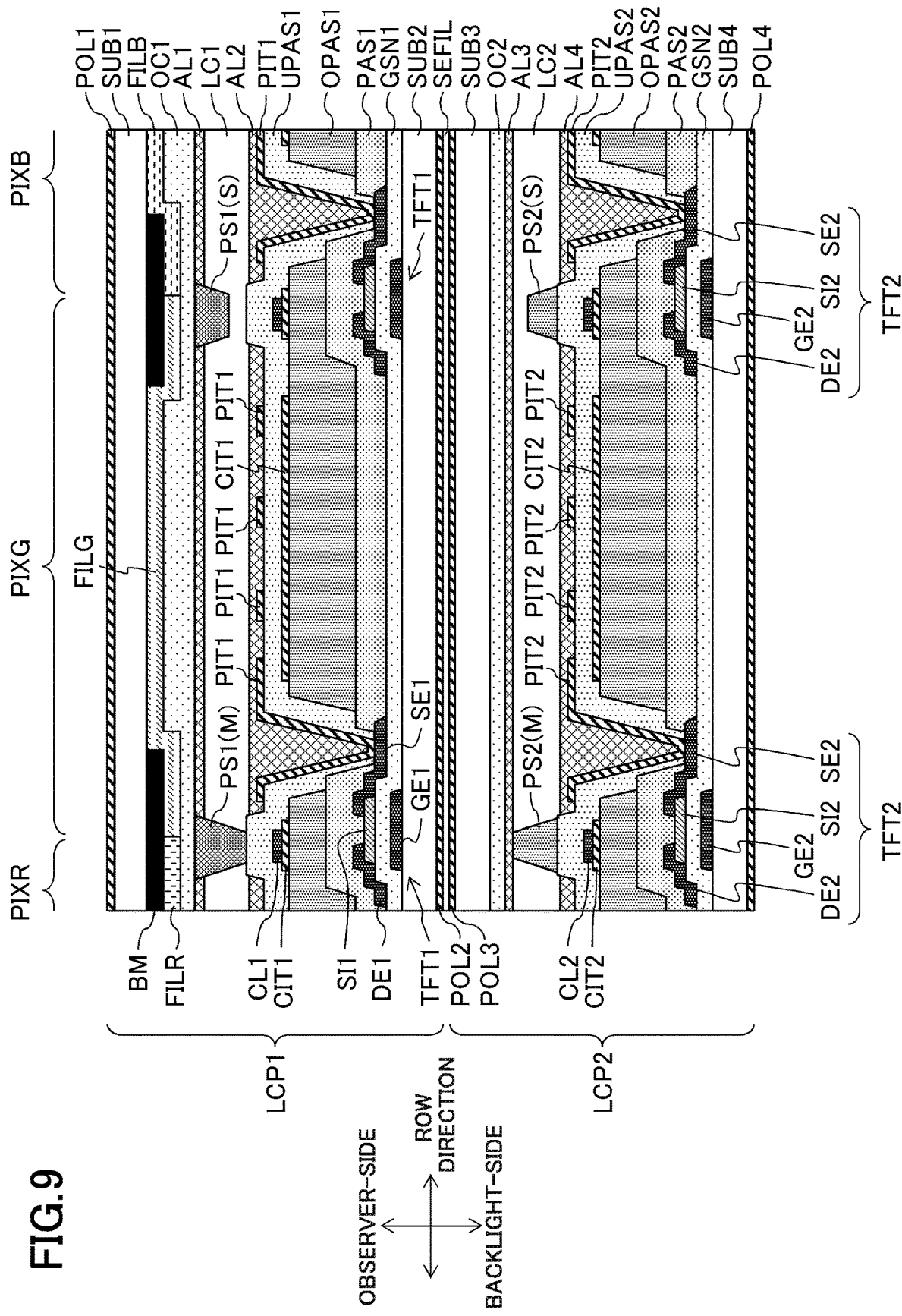
FIG. 9 is a sectional view taken along line B-B in FIGS. 6 and 7.

FIG. 9 is a sectional view taken along line B-B in FIGS. 6 and 7. The sectional structures of pixels PIX1, PIX2 will be described below with reference to FIG. 9.

In thin film transistor substrate TFTB1 (see FIG. 5) constituting pixel PIX1 of display panel LCP1, gate line GL1 (see FIG. 6) and gate electrode GE1 are formed on transparent substrate SUB2 (glass substrate) (third substrate), and gate insulator GSN1 is formed so as to cover gate line GL1 and gate electrode GE1. Source line SL1 (see FIG. 6), drain electrode DE1, source electrode SE1, and semiconductor layer SI1 are formed on gate insulator GSN1, protective insulator PAS1 and organic insulator OPAS1 are sequentially formed so as to cover source lines SL1, drain electrode DE1, source electrode SE1, and semiconductor layer SI1, common electrode CIT1 is formed on organic insulator OPAS1, and upper insulator UPAS1 is formed so as to cover common electrode CIT1. Common wiring CL1, which is constructed with a metallic layer and overlaps source line SL1 in planar view, is formed on common electrode CIT1. Pixel electrode PIT1 is formed on upper insulator UPAS1, and alignment film AL2 is formed so as to cover pixel electrode PIT1. Contact hole CH1 (see FIG. 6) is made in protective insulator PAS1, organic insulator OPAS1, and upper insulator UPAS1, and a part of pixel electrode PIT1 is electrically connected to source electrode SE1 through contact hole CH1. For example, organic insulator OPAS1 is made of an acrylic positive photosensitive resin. A known material can be used as the acrylic positive photosensitive resin.

In counter substrate CF1 (see FIG. 5), black matrix BM and color filter FIL (red color filter FILR, green color filter FILG, and blue color filter FILB) are formed on transparent substrate SUB1 (glass substrate) (fourth substrate). Overcoat film OC1 covers a surface of color filter layer FIL, and alignment film AL1 is formed on overcoat film OC1. In a region overlapping black matrix BM in planar view, main spacer PS1(M) and sub-spacer PS1(S) are formed on overcoat film OC1. An end of main spacer PS1(M) on the side of display panel LCP2 is in contact with a projection in which thin film transistor TFT1 and common wiring CL1 are laminated on thin film transistor substrate TFTB1. A predetermined gap is formed between an end of sub-spacer PS1(S) on the side of display panel LCP2 and thin film transistor substrate TFTB1. Spacer PS1 is made of an acrylic negative photosensitive resin. A known material can be used as the acrylic negative photosensitive resin.

In thin film transistor substrate TFTB2 (see FIG. 5) constituting pixel PIX2 of display panel LCP2, gate line GL2 (see FIG. 7) and gate electrode GE2 are formed on transparent substrate SUB4 (glass substrate) (first substrate), and gate insulator GSN2 is formed so as to cover gate line GL2 and gate electrode GE2. Source line SL2 (see FIG. 7), drain electrode DE2, source electrode SE2, and semiconductor layer SI2 are formed on gate insulator GSN2, protective insulator PAS2 and organic insulator OPAS2 are sequentially formed so as to cover source lines SL2, drain electrode DE2, source electrode SE2, and semiconductor layer SI2, common electrode CIT2 is formed on organic insulator OPAS2, and upper insulator UPAS2 is formed so as to cover common electrode CIT2. Common wiring CL2, which is constructed with a metallic layer and overlaps source line SL2 in planar view, is formed on common electrode CIT2. Pixel electrode PIT2 is formed on upper insulator UPAS2, and alignment film AL4 is formed so as to cover pixel electrode PIT2. Contact hole CH2 (see FIG. 7) is made in protective insulator PAS2, organic insulator OPAS2, and upper insulator UPAS2, and a part of pixel electrode PIT2 is electrically connected to source electrode SE2 through contact hole CH2. Main spacer PS2(M) and sub-spacer PS2(S) are formed on upper insulator UPAS2 so as to overlap thin film transistor TFT1 and common wiring CL1 in planar view. An end of main spacer PS2(M) on the side of display panel LCP1 is in contact with counter substrate CF2. A predetermined gap is formed between an end of sub-spacer PS1(S) on the side of display panel LCP1 and counter substrate CF2. Organic insulator OPAS2 and spacer PS2 are made of an identical material, for example, an acrylic positive photosensitive resin. A known material can be used as the acrylic positive photosensitive resin.

In counter substrate CF2 (see FIG. 5), overcoat film OC2 coats transparent substrate SUB3 (glass substrate) (second substrate), and alignment film AL3 is formed on overcoat film OC2.

Figure 10:
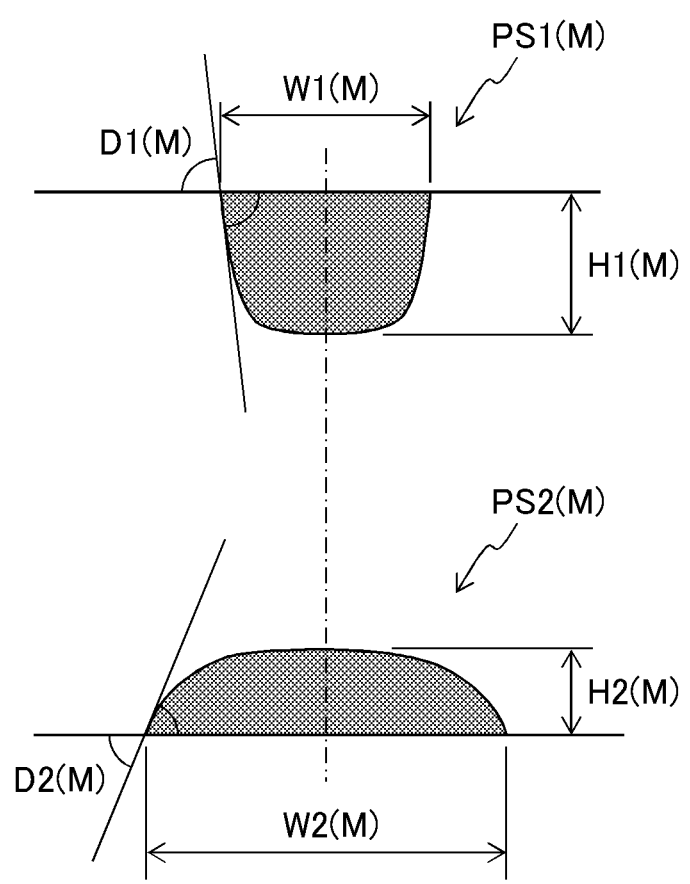
FIG. 10 is a sectional view for comparing main spacer of display panel LCP1 and main spacer of display panel LCP2.
Figure 11:
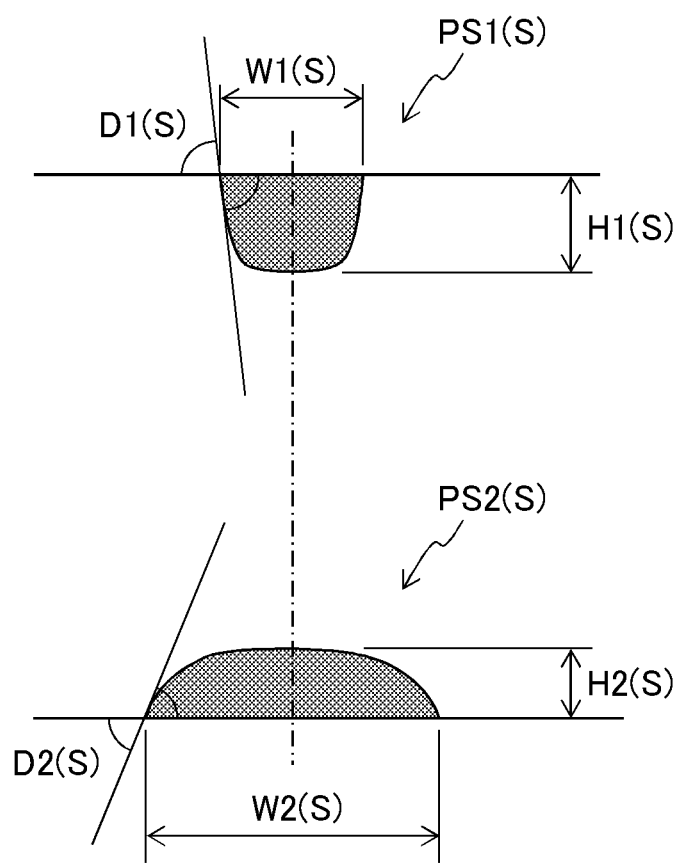
FIG. 11 is a sectional view for comparing sub-spacer of display panel LCP1 and sub-spacer of display panel LCP2.

At this point, spacer PS1 of display panel LCP1 differs from spacer PS2 of display panel LCP2 in the external form due to a difference of the material. FIG. 10 is a sectional view for comparing main spacer PS1(M) of display panel LCP1 and main spacer PS2(M) of display panel LCP2. FIG. 11 is a sectional view for comparing sub-spacer PS1(S) of display panel LCP1 and sub-spacer PS2(S) of display panel LCP2.

As illustrated in FIG. 10, width W2(M) (an outer diameter in planar view) of main spacer PS2(M) is wider than width W1(M) (an outer diameter in planar view) of main spacer PS1(M), and height H1(M) of main spacer PS1(M) is higher than height H2(M) of main spacer PS2(M). Specifically, main spacer PS2(M) has width W2(M) of about 10 μm, and main spacer PS1(M) has width W1(M) of about 5 μm. Main spacer PS2(M) has height H2(M) of about 2 μm to about 3 μm, and main spacer PS1(M) has height H1(M) of about 3 μm to about 5 μm. Inclination angle D2(M) of main spacer PS2(M) to an installation surface is smaller than inclination angle D1(M) of main spacer PS1(M) to an installation surface. Specifically, for example, inclination angle D2(M) of main spacer PS2(M) is less than about 60 degrees, and inclination angle D1(M) of main spacer PS1(M) is greater than or equal to about 60 degrees. Height H1 of spacer PS1 is a distance between spacer PS1 and the installation surface (for example, a surface of overcoat film OC1 on the side of liquid crystal layer LC1), and height H2 of spacer PS2 is a distance between spacer PS2 and the installation surface (for example, a surface of organic insulator UPAS2 on the side of liquid crystal layer LC2).

As illustrated in FIG. 11, a relationship between a shape of sub-spacer PS1(S) and a shape of sub-spacer PS2(S) is similar to a relationship between a shape of main spacer PS1(M) and a shape of main spacer PS2(M) in FIG. 10. In sub-spacer PS1(S) of FIG. 11, width W1(S) and height H1(S) are smaller than width W1(M) and height H1(M) of main spacer PS1(M) in FIG. 10, and inclination angle D1(S) is equal to inclination angle D1(M) of main spacer PS1(M). Similarly, in sub-spacer PS2(S) of FIG. 11, width W2(S) and height H2(S) are smaller than width W2(M) and height H2(M) of main spacer PS2(M) in FIG. 10, and inclination angle D2(S) is equal to inclination angle D2(M) of main spacer PS2(M).

Main spacer PS1(M) and sub-spacer PS1(S) may have an identical shape, and main spacer PS2(M) and sub-spacer PS2(S) may have an identical shape, namely, the heights of main spacer PS1(M) and sub-spacer PS1(S) may be substantially equal to each other, and the heights of main spacer PS2(M) and sub-spacer PS2(S) may be substantially equal to each other. In this case, main spacer PS(M) may be disposed in a highest portion (for example, above a portion in which thin film transistor TFT and common wiring CL overlap each other in planar view) of the installation surface on which spacer PS is installed, and sub-spacer PS(S) may be disposed in a portion lower than the highest portion. Consequently, the height at an upper end of main spacer PS(M) can be higher than the height at an upper end of sub-spacer PS(S).

Spacer PS1 of display panel LCP1 differs from spacer PS2 of display panel LCP2 in elastic force due to the difference of the material. Specifically, in the case that an identical pressure is applied to spacer PS1 and spacer PS2, a deformation amount of spacer PS2 is smaller than a deformation amount of spacer PS1.

A method for manufacturing spacer PS2 of display panel LCP2 will be described below. Because a known method can be adopted to a method for manufacturing spacer PS1 of display panel LCP1, the description will be omitted.

Figure 12A:
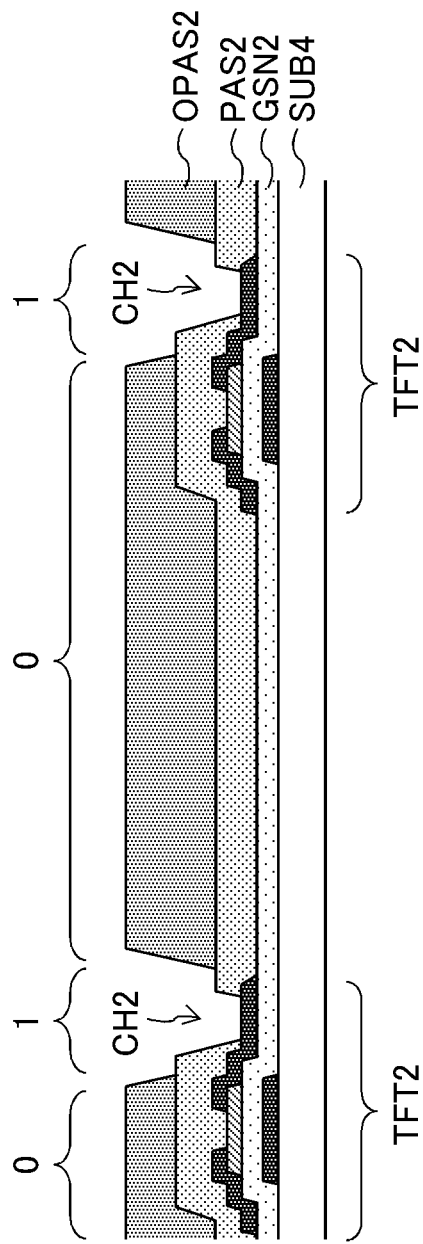
FIGS. 12A and 12B are views each illustrating a first method for manufacturing main spacer and sub-spacer.
Figure 12B:
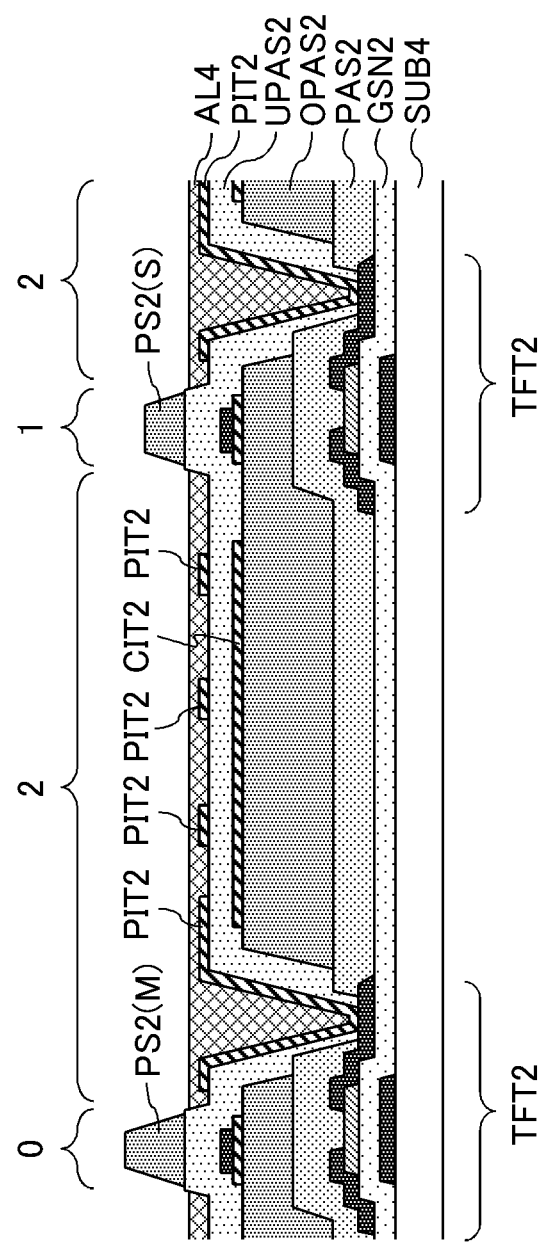

FIGS. 12A and 12B are views each illustrating a first method for manufacturing main spacer PS2(M) and sub-spacer PS2(S). As illustrated in FIG. 12A, after protective insulator PAS2 is formed, the acrylic positive photosensitive resin is applied onto the substrate on which protective insulator PAS2 is formed, and exposed through a mask having a predetermined pattern. At this point, an exposure value is set to 1 (full exposure) in a portion constituting contact hole CH2, and the exposure value is set to 0 (without exposure) in other portions. Then, development is performed, and the exposed portion is removed, thereby forming organic insulator OPAS2. As illustrated in FIG. 12B, after common electrode CIT2, upper insulator UPAS2, and pixel electrode PIT2 are formed, the same acrylic positive photosensitive resin as organic insulator OPAS2 is applied onto the substrate, and exposed through a mask having a predetermined pattern. At this point, the exposure value is set to 0 (without exposure) in a portion constituting main spacer PS2(M), the exposure value is set to 1 (half-tone exposure) in a portion constituting sub-spacer PS2(S), and the exposure value is set to 2 (full exposure) in other portions. Then, the development is performed, and the exposed portion is removed, thereby simultaneously forming main spacer PS2(M) and sub-spacer PS2(S). Finally alignment film AL4 is formed.

The exposure value is conceptually indicated by the above numerical values "0", "1", "2", but a ratio of the exposure value is not indicated. That is, the exposure value increases with increasing numerical value.

Figure 13A:
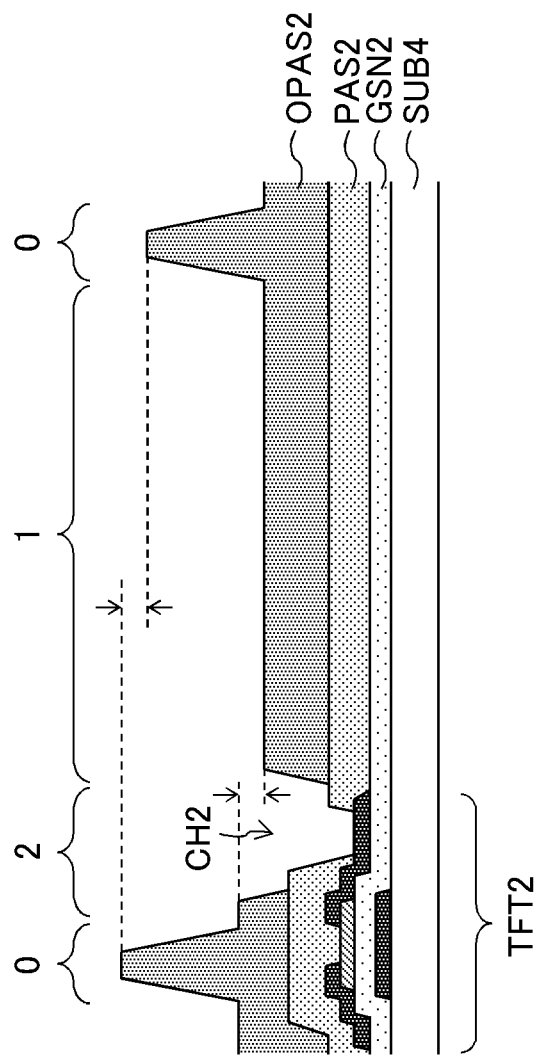
FIGS. 13A and 13B are views each illustrating a second method for manufacturing main spacer and sub-spacer.
Figure 13B:
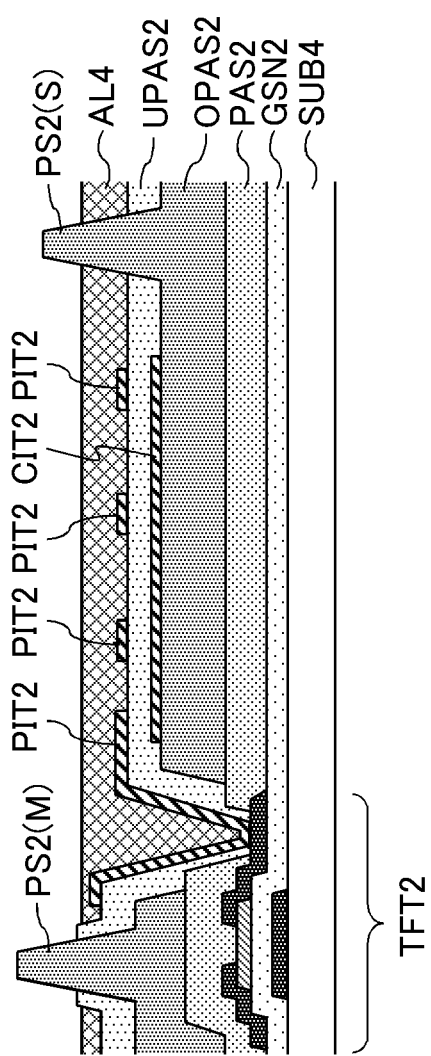

FIGS. 13A and 13B are views each illustrating a second method for manufacturing main spacer PS2(M) and sub-spacer PS2(S). As illustrated in FIG. 13A, after protective insulator PAS2 is formed, the acrylic positive photosensitive resin is applied onto the substrate on which protective insulator PAS2 is formed, and exposed through a mask having a predetermined pattern. At this point, the exposure value is set to 2 (full exposure) in the portion constituting contact hole CH2, the exposure value is set to 0 (without exposure) in the portion constituting main spacer PS2(M) and sub-spacer PS2(S), and the exposure value is set to 1 (half-tone exposure) in other portions. Then, the development is performed, and the exposed portion is removed, thereby integrally forming organic insulator OPAS2, main spacer PS2(M), sub-spacer PS2(S) at the same time. A mask pattern is set such that main spacer PS2(M) is formed above the region where thin film transistor TFT2 is formed while sub-spacer PS2(S) is formed above the outside of the region where thin film transistor TFT2 is formed, which allows the height at the upper end of main spacer PS2(M) to be higher than the height at the upper end of sub-spacer PS2(S). Common electrode CIT2, upper insulator UPAS2, and pixel electrode PIT2 are formed as illustrated in FIG. 13B, and finally alignment film AL4 is formed.

Figure 14A:
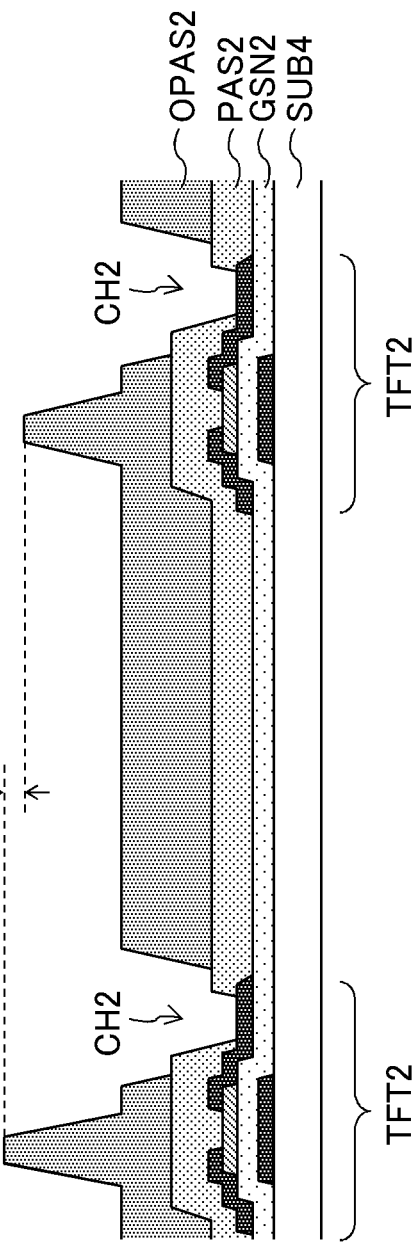
FIGS. 14A and 14B are views each illustrating a third method for manufacturing main spacer and sub-spacer.
Figure 14B:
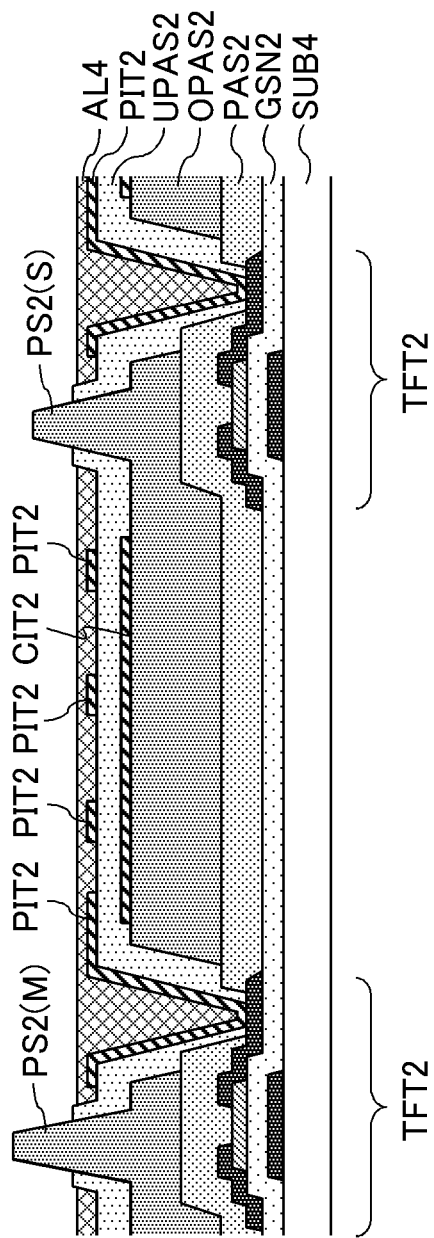

FIGS. 14A and 14B are views each illustrating a third method for manufacturing main spacer PS2(M) and sub-spacer PS2(S). As illustrated in FIG. 14A, after protective insulator PAS2 is formed, the acrylic positive photosensitive resin is applied onto the substrate on which protective insulator PAS2 is formed, and exposed through a mask having a predetermined pattern. At this point, the exposure value is set to 3 (full exposure) in the portion constituting contact hole CH2, the exposure value is set to 0 (without exposure) in the portion constituting main spacer PS2(M), the exposure value is set to 1 (half-tone exposure) in the portion constituting sub-spacer PS2(S), and the exposure value is set to 2 (half-tone exposure) in other portions. Then, the development is performed, and the exposed portion is removed, thereby integrally forming organic insulator OPAS2, main spacer PS2(M), sub-spacer PS2(S) at the same time. In the third method, both main spacer PS2(M) and sub-spacer PS2(S) are formed above the region where thin film transistor TFT2 is formed. At this point, the exposure values of main spacer PS2(M) and sub-spacer PS2(S) vary, whereby the height at the upper end of main spacer PS2(M) is higher than the height at the upper end of sub-spacer PS2(S). Common electrode CIT2, upper insulator UPAS2, and pixel electrode PIT2 are formed as illustrated in FIG. 14B, and finally alignment film AL4 is formed.

Figure 15A:
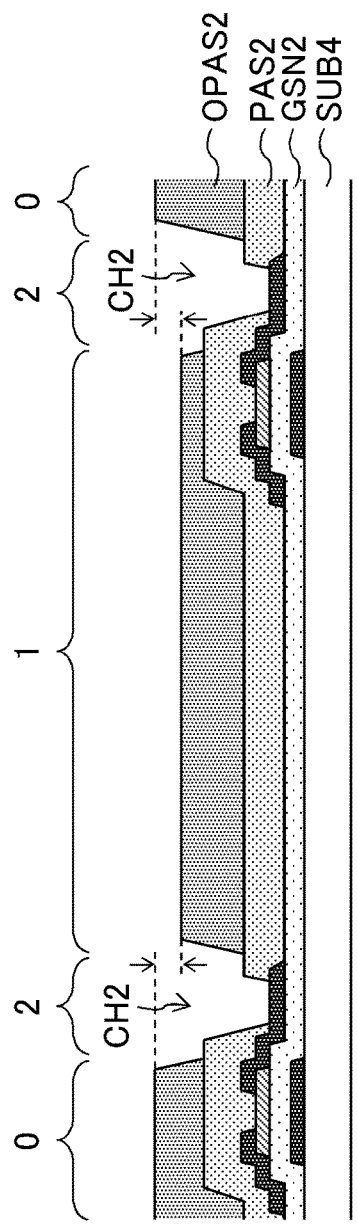
FIGS. 15A, 15B and 15C are views each illustrating a fourth method for manufacturing main spacer and sub-spacer.
Figure 15B:
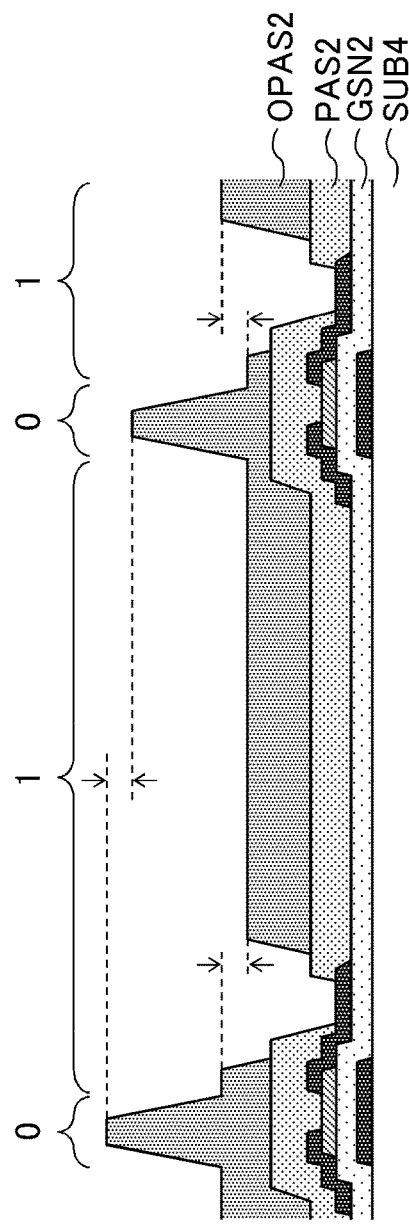
Figure 15C:
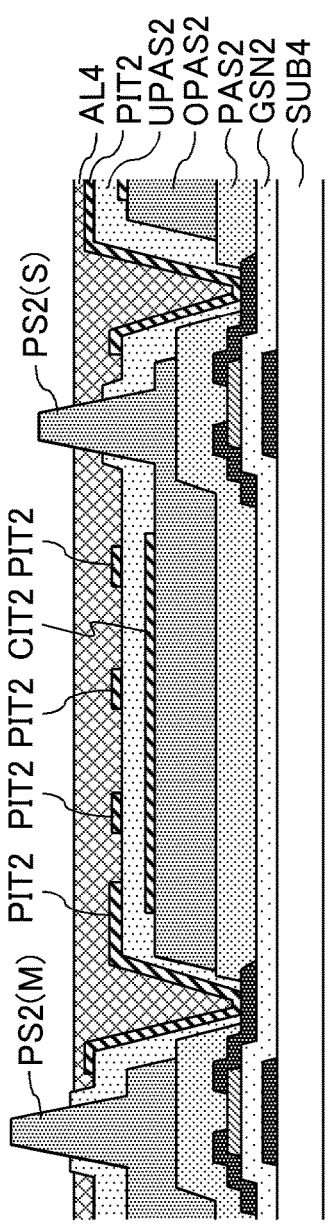

FIGS. 15A to 15C are views each illustrating a fourth method for manufacturing main spacer PS2(M) and sub-spacer PS2(S). As illustrated in FIG. 15A, after protective insulator PAS2 is formed, the acrylic positive photosensitive resin is applied onto the substrate on which protective insulator PAS2 is formed, and exposed through a mask having a predetermined pattern. At this point, the exposure value is set to 2 (full exposure) in the portion constituting contact hole CH2, the exposure value is set to 0 (without exposure) from the portion constituting contact hole CH2 to the portion constituting main spacer PS2(M), and the exposure value is set to 1 (half-tone exposure) from the portion constituting contact hole CH2 to the portion constituting sub-spacer PS2(S). Then, the development is performed, and the exposed portion is removed, thereby forming organic insulator OPAS2 having a different height. Then, as illustrated in FIG. 15B, the acrylic positive photosensitive resin is applied onto the substrate again, and the exposure is performed through a mask having a predetermined pattern. At this point, the exposure value is set to 0 (without exposure) in the portion constituting main spacer PS2(M) and sub-spacer PS2(S), the exposure value is set to 1 (full exposure) in other portions. Then, the development is performed, and the exposed portion is removed, thereby simultaneously forming main spacer PS2(M) and sub-spacer PS2(S). Common electrode CIT2, upper insulator UPAS2, and pixel electrode PIT2 are formed as illustrated in FIG. 15C, and finally alignment film AL4 is formed.

In the configuration of liquid crystal display device LCD, in particular spacer PS2 of display panel LCP2 can be formed on thin film transistor substrate TFTB2 using the same material as organic insulator OPAS2, so that the process of manufacturing display panel LCP2 can be simplified.

Figure 16:
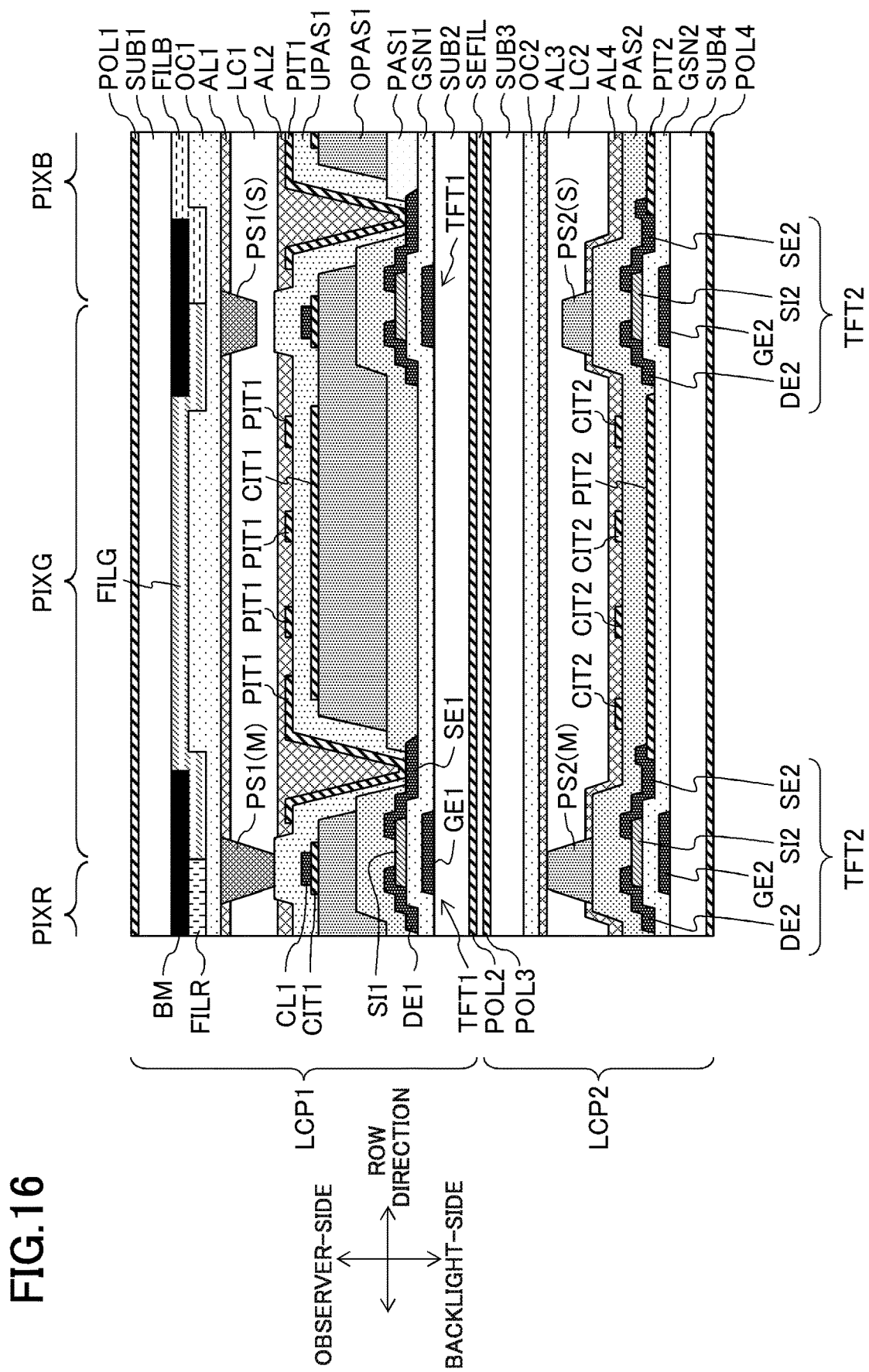
FIG. 16 is a sectional view illustrating another configuration of liquid crystal display device.
Figure 17:
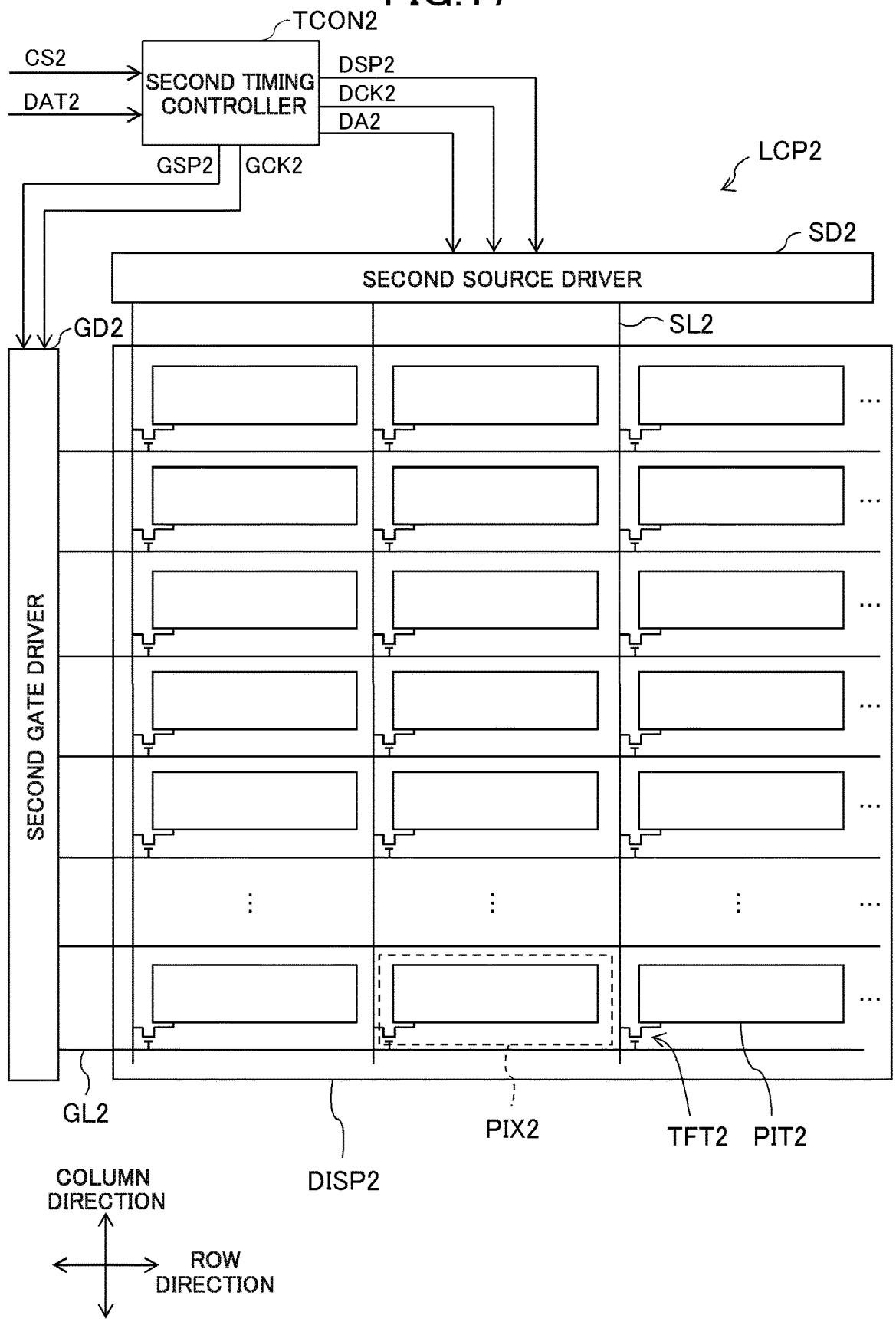
FIG. 17 is a plan view illustrating a schematic configuration of pixel of display panel LCP2.

Liquid crystal display device LCD of the present disclosure is not limited to the above configuration. For example, a sectional structure of pixel PIX2 of display panel LCP2 may be simplified. FIG. 16 is a sectional view illustrating another configuration of liquid crystal display device LCD. Specifically, as illustrated in FIG. 16, in thin film transistor substrate TFTB2 of display panel LCP2, pixel electrode PIT2 may be formed on gate insulator GSN2, protective insulator PAS2 may be formed so as to cover pixel electrode PIT2, and common electrode CIT2 may be formed on protective insulator PAS2. Consequently, thinner display panel LCP2 and the simplification of the process of manufacturing display panel LCP2 can be achieved.

Figure 18A:
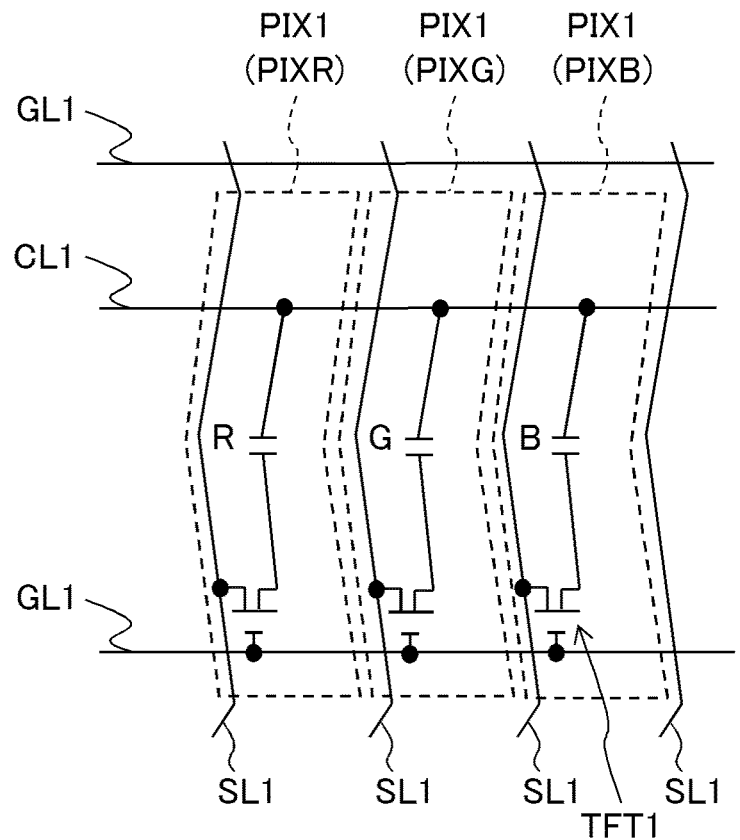
FIGS. 18A and 18B are plan views each illustrating another disposition relationship between pixel of display panel LCP1 and pixel of display panel LCP2.
Figure 18B:
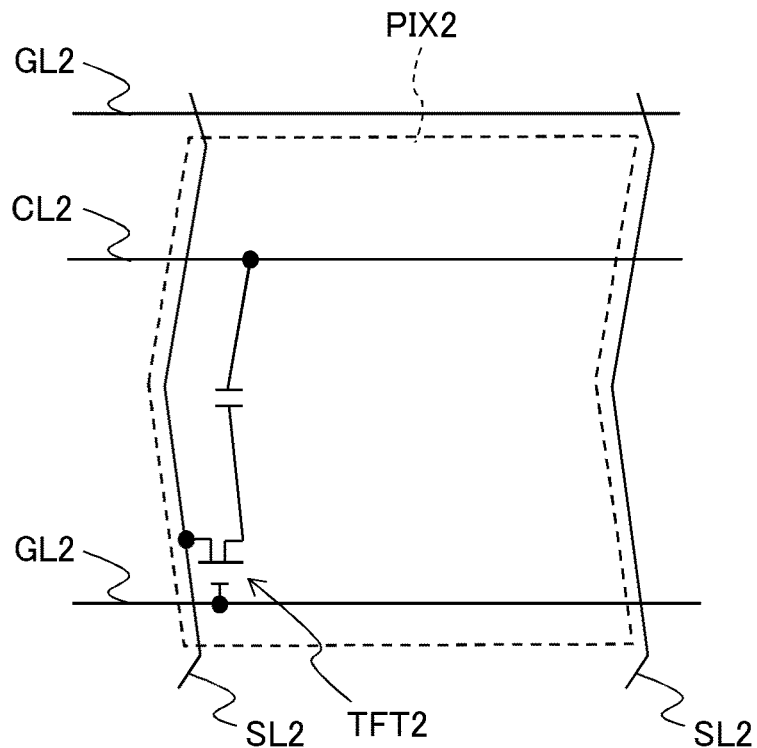

The disposition relationship between pixel PIX1 of display panel LCP1 and pixel PIX2 of display panel LCP2 is not limited to those in FIGS. 3, 4, 8A, and 8B. For example, as illustrated in FIGS. 3, 17, 18A, and 18B, liquid crystal display device LCD is configured such that a number of pixels PIX2 per unit area of display panel LCP2 is smaller than a number of pixels PIX1 per unit area of display panel LCP1. Specifically, as illustrated in FIGS. 18A and 18B, liquid crystal display device LCD is configured such that the ratio of the number of pixels PIX1 of display panel LCP1 to the number of pixels PIX2 of display panel LCP2 is 3:1. Three pixels PIX1 (red pixel PIXR, green pixel PIXG, blue pixel PIXB) of display panel LCP1 and one pixel PIX2 of display panel LCP2 are disposed so as to overlap each other in planar view. In the case that spacer PS2 is made of the acrylic positive photosensitive resin, because width W2 of spacer PS2 easily becomes wider than width W1 of spacer PS1 as illustrated in FIGS. 10 and 11, it is considered that an opening ratio of pixel PIX2 of display panel LCP2 is lowered. In this respect, display panel LCP2 is configured in FIGS. 18A and 18B, which allows prevention of an influence of lowering the opening ratio. In the case that display panel LCP2 is configured in FIGS. 18A and 18B, the pixel structure of display panel LCP2 may be similar to the pixel structure in FIG. 16.

Figure 19:
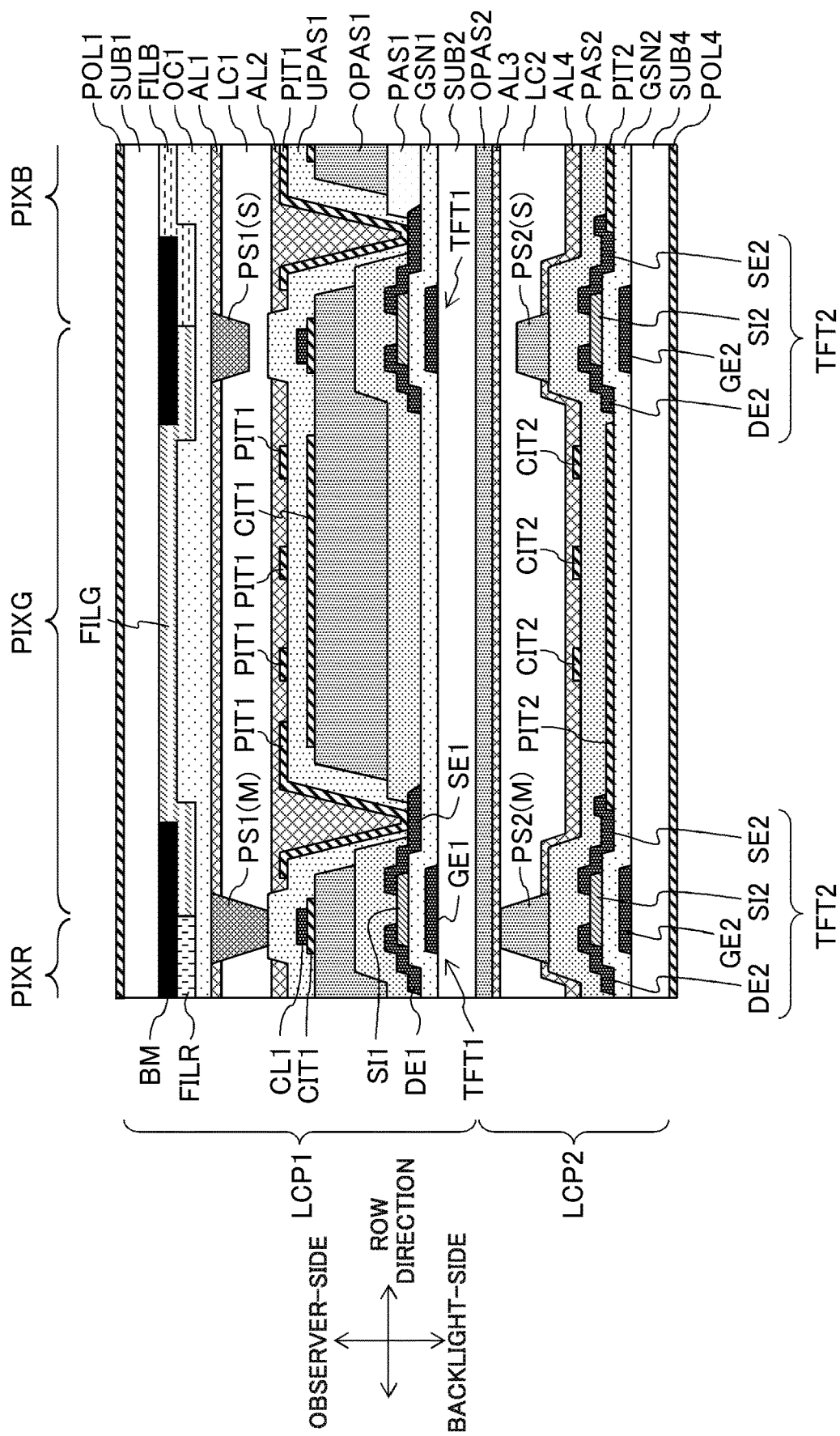
FIG. 19 is a sectional view illustrating still another configuration of liquid crystal display device LCD.

In liquid crystal display device LCD of the exemplary embodiment, because spacer PS2 is not formed on counter substrate CF2 of display panel LCP2, counter substrate CF2 can also be eliminated. FIG. 19 is a sectional view illustrating still another configuration of liquid crystal display device LCD. The glass substrate is constructed with three glass substrates in liquid crystal display device LCD of FIG. 19, and in central glass substrate SUB2, thin film transistor TFT1 is formed on the observer side similarly to the configuration in FIG. 9 and organic insulator OPAS2 and alignment film AL3 are formed on the backlight side. Consequently, a distance between liquid crystal layer LC1 and liquid crystal layer LC2 is shortened, so that degradation of the display quality due to a parallax and moire can be prevented. Liquid crystal display device LCD can further be thinned.

Figure 20:
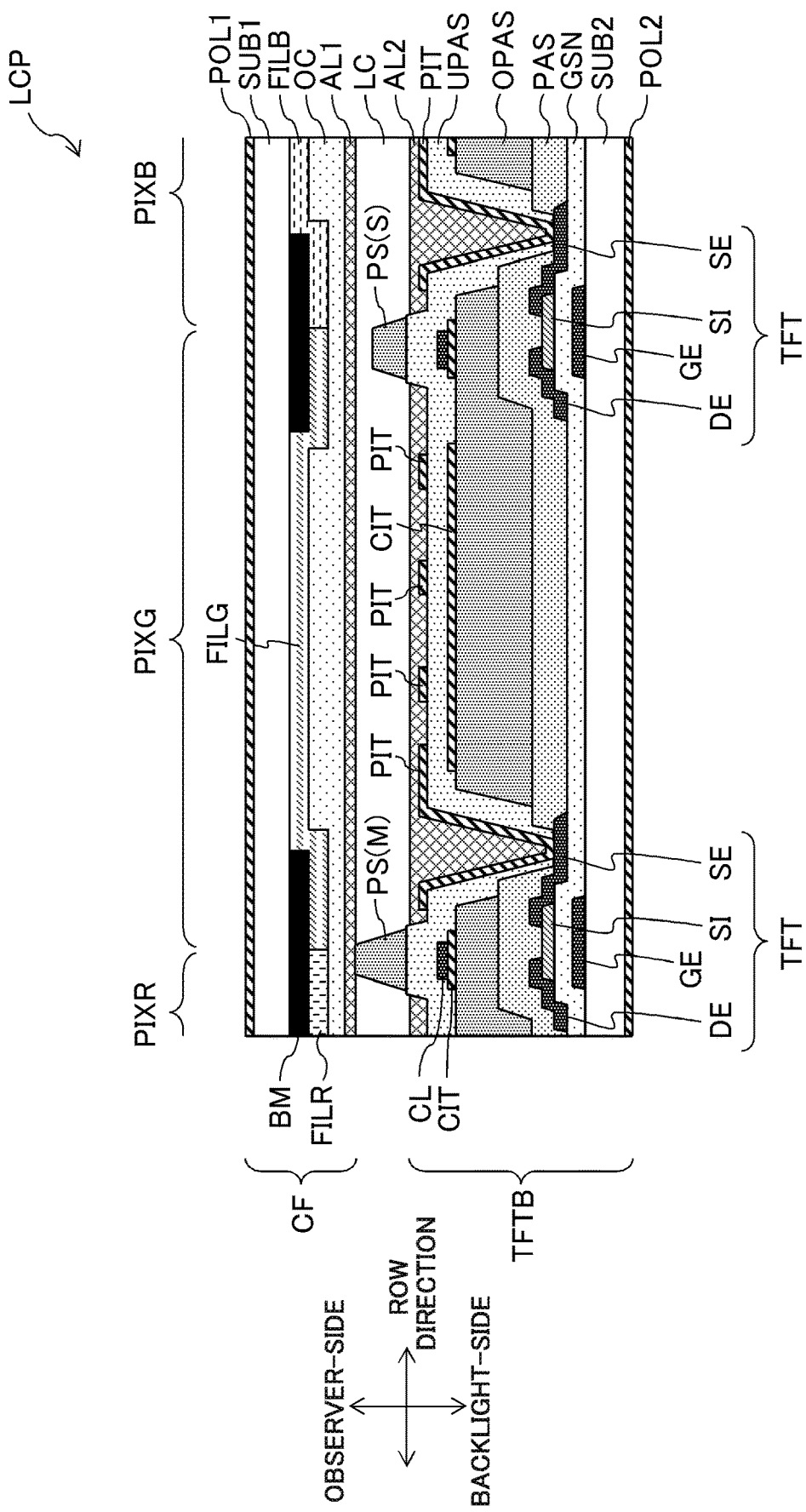
FIG. 20 is a sectional view illustrating still another configuration of liquid crystal display device LCD.

Liquid crystal display device LCD of the present disclosure is not limited to the configuration of the plurality of display panels, but may have the configuration of one display panel. FIG. 20 is a sectional view illustrating yet another configuration of liquid crystal display device LCD. Liquid crystal display device LCD in FIG. 20 includes display panel LCP having the same configuration as display panel LCP1 in FIG. 9 except for spacer PS. In liquid crystal display device LCD of FIG. 20, spacer PS is formed on thin film transistor substrate TFTB. Spacer PS is made of the same material as organic insulator OPAS, for example, the acrylic positive photosensitive resin. Spacer PS can be manufactured by any one of the first to fourth methods in FIGS. 12A to 15C.

Figure 21:
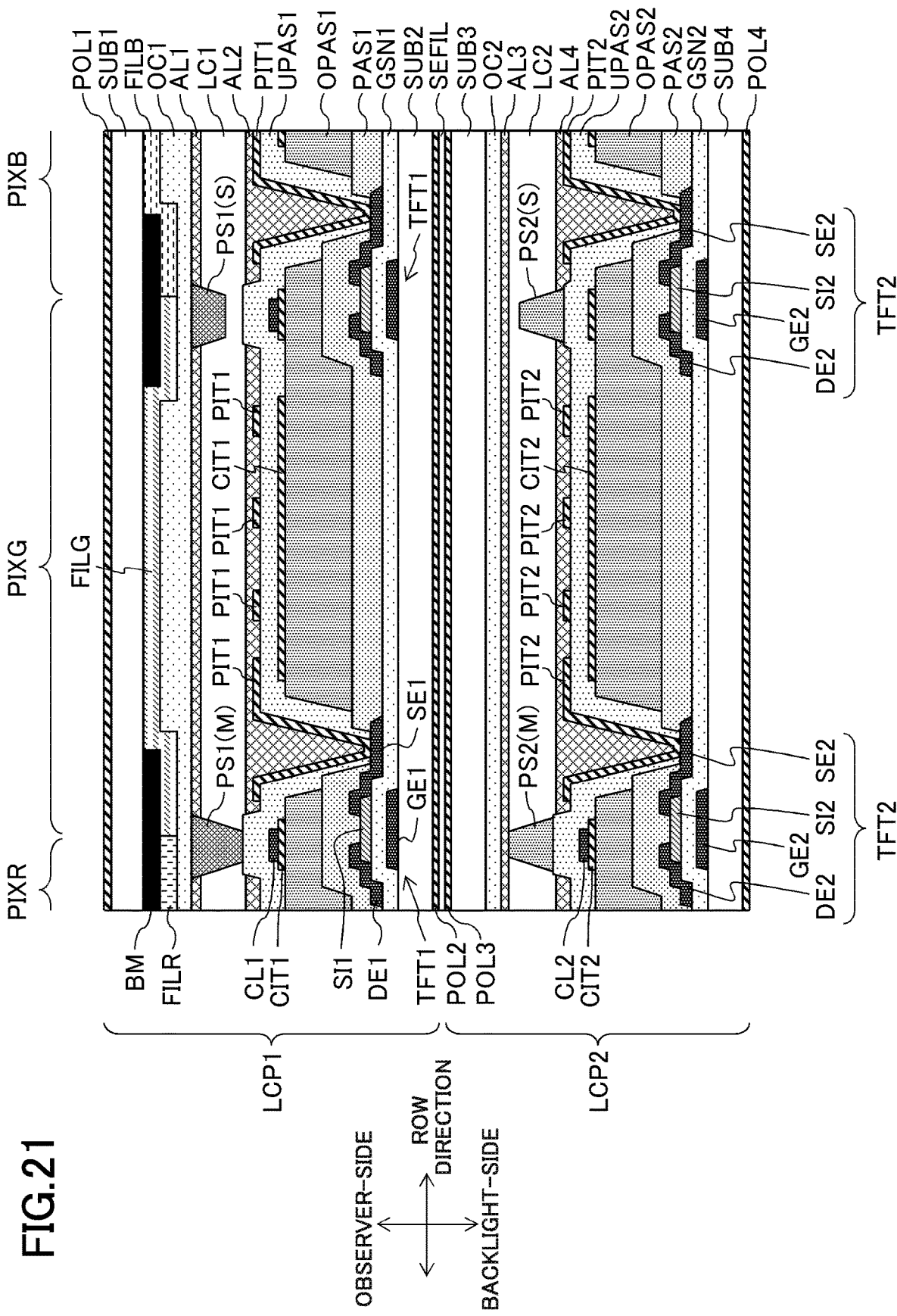
FIG. 21 is a sectional view illustrating still another configuration of liquid crystal display device LCD.
Figure 22A:
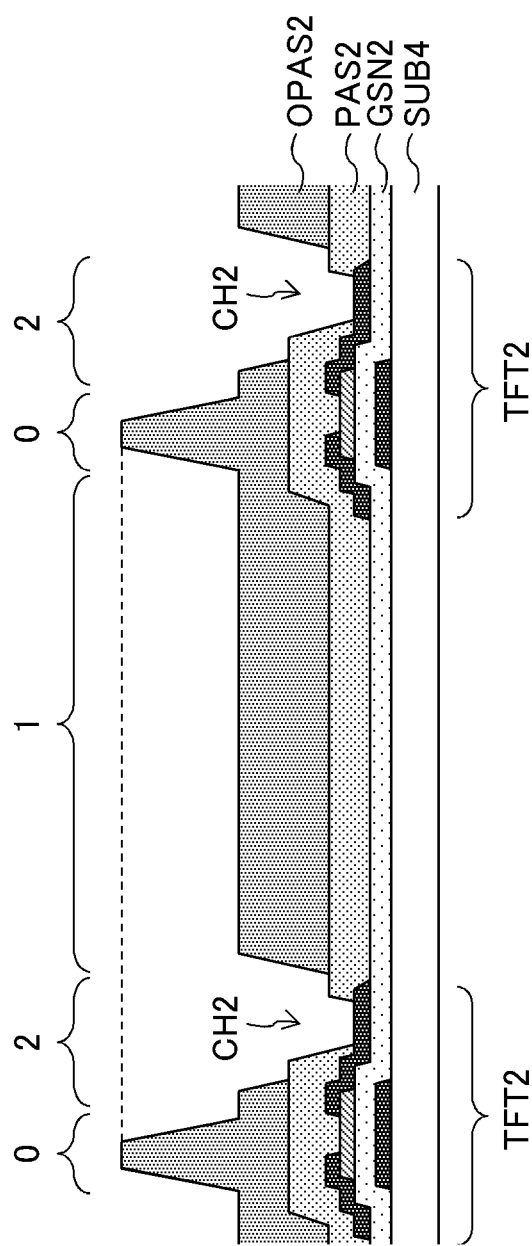
FIGS. 22A and 22B are view each illustrating another method for manufacturing main spacer and sub-spacer.
Figure 22B:
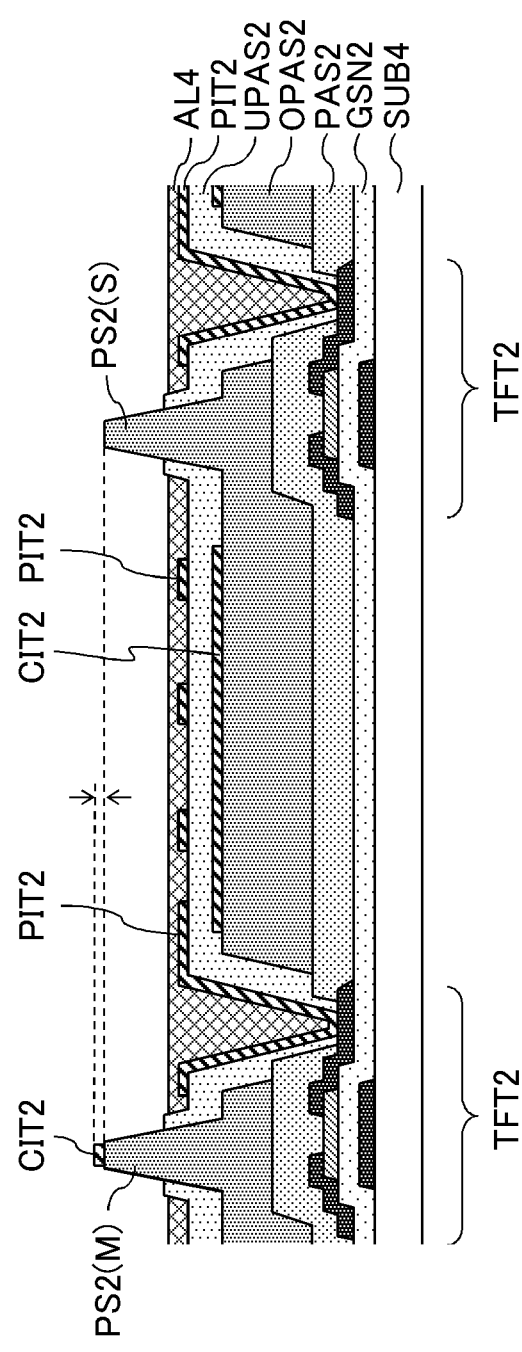

In liquid crystal display device LCD of the exemplary embodiment, as illustrated in FIG. 21, main spacer PS2(M) may overlap common wiring CL2 in planar view, and sub-spacer PS2(S) may not overlap common wiring CL2 in planar view. In liquid crystal display device LCD of the exemplary embodiment, main spacer PS2(M) may overlap common electrode CIT2 in planar view, and sub-spacer PS2(S) may not overlap common electrode CIT2 in planar view. For example, the configuration can be manufactured by the following method. As illustrated in FIG. 22A, after protective insulator PAS2 is formed, the acrylic positive photosensitive resin is applied onto the substrate on which protective insulator PAS2 is formed, and exposed through a mask having a predetermined pattern. At this point, the exposure value is set to 2 (full exposure) in the portion constituting contact hole CH2, the exposure value is set to 0 (without exposure) in the portion constituting main spacer PS2(M) and sub-spacer PS2(S), and the exposure value is set to 1 (half-tone exposure) in other portions. Then, the development is performed, and the exposed portion is removed, thereby integrally forming organic insulator OPAS2, main spacer PS2(M), sub-spacer PS2(S) at the same time. Then, common electrode CL2 is formed on an upper surface of main spacer PS2(M) but not formed on an upper surface of sub-spacer PS2(S). In the configuration, main spacer PS2(M) and sub-spacer PS2(S) may have the identical shape, namely, the heights of main spacer PS2(M) and sub-spacer PS2(S) may be equal to each other. Consequently, the height at an upper end of main spacer PS(M) can be higher than the height at an upper end of sub-spacer PS(S). The height of main spacer PS2(M) may be higher than the height of sub-spacer PS2(S).

In liquid crystal display device LCD of the exemplary embodiment, main spacer PS2(M) may overlap source line SL2 in planar view, and sub-spacer PS2(S) may not overlap source line SL2 in planar view. Even in the configuration, main spacer PS2(M) and sub-spacer PS2(S) may have the identical shape, namely, the heights of main spacer PS2(M) and sub-spacer PS2(S) may be equal to each other. Consequently, the height at an upper end of main spacer PS(M) can be higher than the height at an upper end of sub-spacer PS(S). The height of main spacer PS2(M) may be higher than the height of sub-spacer PS2(S).

Although exemplary embodiments of the present disclosure are described above, the present disclosure is not limited to these exemplary embodiments. It is noted that exemplary embodiments properly changed from the exemplary embodiments described above by those skilled in the art without departing from the scope of the present disclosure are included in the present disclosure.

What is claimed is:

1. A liquid crystal display device in which a plurality of display panels are disposed so as to overlap each other and which displays an image on each of the plurality of display panels, the liquid crystal display device comprising:
   a first display panel; and
   a second display panel disposed so as to overlap the first display panel,
   wherein the second display panel includes a first substrate on which a source line, a gate line, a thin film transistor, and an organic insulator are formed, a second substrate disposed opposite to the first substrate, and a liquid crystal layer disposed between the first substrate and the second substrate, a first spacer is formed in the first substrate to hold a distance between the first substrate and the second substrate, the first spacer and the organic insulator are made of a positive photosensitive resin, the first display panel includes a third substrate on which a source line, a gate line, and a thin film transistor are formed and a fourth substrate disposed opposite to the third substrate, a second spacer is formed in the fourth substrate to hold a distance between the third substrate and the fourth substrate, the second spacer is made of a negative photosensitive resin, and an inclination angle of the first spacer to an installation surface is less than 60 degrees, and an inclination angle of the second spacer to an installation surface is greater than or equal to 60 degrees.

2. The liquid crystal display device according to claim 1, wherein the first spacer and the organic insulator are integrated with each other.

3. The liquid crystal display device according to claim 1, wherein the second display panel includes the gate line formed on the first substrate, a gate insulator that is formed on the first substrate so as to cover the gate line, an electrode constituting the thin film transistor formed on the gate insulator, a protective insulator covering the electrode, the organic insulator formed on the protective insulator, a common electrode formed on the organic insulator, an upper insulator covering the common electrode, and the first spacer and a pixel electrode, which are formed on the upper insulator.

4. The liquid crystal display device according to claim 1, wherein the second display panel includes the gate line formed on the first substrate, a gate insulator that is formed on the first substrate so as to cover the gate line, an electrode constituting the thin film transistor formed on the gate insulator, a protective insulator covering the electrode, the organic insulator formed on the protective insulator, a common electrode formed on the organic insulator, an upper insulator covering the common electrode, and a pixel electrode formed on the upper insulator, and the first spacer is integral with the organic insulator.

5. The liquid crystal display device according to claim 1, wherein a color filter is formed on one of the third substrate and the fourth substrate.

6. The liquid crystal display device according to claim 1, wherein a number of pixels per unit area in the second display panel is smaller than a number of pixels per unit area in the first display panel.

7. The liquid crystal display device according to claim 1, wherein the second display panel further includes a third spacer formed on the first substrate, a space is formed between the third spacer and the second substrate, and the third spacer is made of a positive photosensitive resin.

8. The liquid crystal display device according to claim 7, wherein the first spacer overlaps the source line in planar view, and the third spacer does not overlap the source line in planar view.

9. The liquid crystal display device according to claim 7, wherein the second display panel further includes a pixel electrode formed on the first substrate, a common electrode that is disposed opposite to the pixel electrode, and a common wiring electrically connected to the common electrode, the common wiring being formed by a metallic layer, the first spacer overlaps the common wiring in planar view, and the third spacer does not overlap the common wiring in planar view.

10. The liquid crystal display device according to claim 7, wherein the first spacer, the third spacer, and the organic insulator are integrated with one another, and a height of the first spacer is substantially equal to a height of the third spacer, based on an upper surface of the organic insulator on the liquid crystal layer side.

11. The liquid crystal display device according to claim 7, wherein the first spacer, the third spacer, and the organic insulator are integrated with one another, and a height of the first spacer is higher than a height of the third spacer, based on an upper surface of the organic insulator on a liquid crystal layer side.

* * * * *